(12) United States Patent
Xi et al.

(10) Patent No.: US 12,411,336 B2
(45) Date of Patent: Sep. 9, 2025

(54) METHOD TO THERMO-REVERSIBLY CONTROL LIGHT AND HEAT FLOW WITH BICONTINUOUS MICRO-DOMAIN

(71) Applicants: University of Delaware, Newark, DE (US); Government of the United States of America, as represented by the Secretary of Commerce, Gaithersburg, MD (US)

(72) Inventors: Yuyin Xi, San Jose, CA (US); Yun Liu, Gaithersburg, MD (US)

(73) Assignees: University Of Delaware, Newark, DE (US); Government of the United States of America, as Represented by the Secretary of Commerce, Gaithersburg, MD (US)

( * ) Notice: Subject to any disclaimer, the term of this patent is extended or adjusted under 35 U.S.C. 154(b) by 382 days.

(21) Appl. No.: 18/017,106

(22) PCT Filed: Jul. 27, 2021

(86) PCT No.: PCT/US2021/070989
§ 371 (c)(1),
(2) Date: Jan. 20, 2023

(87) PCT Pub. No.: WO2022/027017
PCT Pub. Date: Feb. 3, 2022

(65) Prior Publication Data
US 2023/0305289 A1    Sep. 28, 2023

Related U.S. Application Data

(60) Provisional application No. 63/171,139, filed on Apr. 6, 2021, provisional application No. 63/056,794, filed on Jul. 27, 2020.

(51) Int. Cl.
| | | |
|---|---|---|
| *G02B 26/00* | (2006.01) | |
| *C09K 9/00* | (2006.01) | |
| *B82Y 20/00* | (2011.01) | |

(52) U.S. Cl.
CPC .............. *G02B 26/004* (2013.01); *C09K 9/00* (2013.01); *B82Y 20/00* (2013.01)

(58) Field of Classification Search
CPC ...... G02B 26/004; G02B 26/005; C09K 9/00; B82Y 20/00; B82Y 30/00
(Continued)

(56) References Cited

U.S. PATENT DOCUMENTS

2010/0117503 A1* 5/2010 Mizuno ................. C01G 25/02
                                                                977/773
2012/0107649 A1    5/2012 Wang
(Continued)

FOREIGN PATENT DOCUMENTS

CN          108933285 A    12/2018
KR          20200060665 A   6/2020

OTHER PUBLICATIONS

Wang et al. "Towards full-colour tunability of inorganic electrochromic devices using ultracompact fabry-perot nanocavities", Nat. Commun., 2020, 11, 302, https://www.nature.com/s41467-019-14194-y#citeas, 9 pages.
(Continued)

*Primary Examiner* — William R Alexander
(74) *Attorney, Agent, or Firm* — BUCHANAN INGERSOLL & ROONEY PC

(57) ABSTRACT

A dynamically tunable composition, a device including the composition, a method of dynamically tuning radiation transmission through the composition, and a method of thermo-reversibly controlling operation of a filter formed from the composition. The composition includes a plurality
(Continued)

of nanoparticles dispersed in a single phase region of a binary solvent systems composed of a first solvent and a second solvent, the nanoparticles having a preferential wettability to the first solvent. Changing temperature of the composition causes it to transition thermo-reversibly from the liquid state to a gel state having bi-continuous domains, including a particle domain and a solvent domain. The particle domain features nanoparticles dispersed in a first-solvent-rich fraction of the binary solvent system, and the solvent domain is a second-solvent-rich fraction of the binary solvent system. Exemplary devices incorporating the composition include a filter, a temperature sensor, a smart window, a smart display, a battery, and a tissue growth scaffold.

20 Claims, 14 Drawing Sheets

(58) Field of Classification Search
USPC .......................................................... 359/288
See application file for complete search history.

(56) References Cited

U.S. PATENT DOCUMENTS

| | | | |
|---|---|---|---|
| 2015/0064446 A1* | 3/2015 | Luchinger | B82Y 30/00 427/372.2 |
| 2019/0106627 A1* | 4/2019 | Arasi | C09K 19/3003 |

OTHER PUBLICATIONS

Xi et al., "Controlling Bicontinuous Structures through a Solvent Segregation-Driven Gel", Langmuir, 2021, 37, 2170-2178, https://doi.org/10.1021/acs.langmuir.0c03472.
Xi et al., "Tunable thermo-reversible bicontinuous nanoparticle gel driven by the binary solvent segregation", Nat. Commun., 2021, 12, 910, https://doi.org/10.1038/s41467-020-20701-3, 21 pages.
Yue et al., "Lamellar Hydrogels with High Toughness and Ternary Tunable Photonic Stop-Band", Adv. Mater., 2013, 25, 3106-3110, https://doi.org/10.1002/adma.201300775.
Zhang et al., "Broadband transparent optical phase change materials for high-performance nonvolatile photonics", Nat. Commun., 2019, 10, 4279, https://www.nature.com/articles/s41467-019-12196-4/#citeas, 9 pages.
Zia et al., "A micro-mechanical study of coarsening and rheology of colloidal gels: Cage building, cage hopping, and Smoluchowski's ratchet", J. Rheol., 2014, 58, 1121-1157, https://doi.org/10.1039/c8sm00109).
Imperiali et al., "A Simple Route towards Graphene Oxide Frameworks", Mater. Horiz., 2014, 1 (1), 139-145. https://doi.org/10.1039/C3MM00047H.
Bai et al., "Large-Scale Noniridescent Structural Color Printing Enabled by Infiltration-Driven Nonequilibrium Colloidal Assembly", Adv. Mater., 2018, 30, 1705667, https://doi.org/10.1002/adma.201705667, 7 pages.
Binks, B., "Particles as surfactants—similarities and differences", Curr. Opin. Colloid Interface Sci., 2002, 7, 21-41, https://doi.org/10.1016/S1359-0294(02)00008-0.
Burkhardt et al., "Casimir Interaction of Spheres in a Fluid at the Critical Point", Phys. Rev. Lett., 1995, 74 (16), 3189-3192. https://doi.org/10.1103/PhysRevLett.74.3189.
Cates et al., "Bijels: a new lass of soft materials", Soft Matter, 2008, 4, 2132, https://doi.org/10.1039/B807312K, 7 pages.
Davy et al., "Pairing of near-ultraviolet solar cells with electrochromic windows for smart management of the solar spectrum", Nat. Energy, 2017, 2, 17104, https://doi.org/10.1038/nenergy.2017.104, 11 pages.
Clegg, P.S., "Bijels: Bicontinous Particle-stabilized Emulsions", Soft Matter Series No. 10, Royal Society of Chemistry, 2020, 38 pages.

Firoozmand et al., "Interfacial Structuring in a Phase-Separating Mixed Biopolymer Solution Containing Colloidal Particles", Langmuir, 2009, 25 (3), 1300-1305. https://doi.org/10.1021/la8037389.
Grattoni et al., "Lower Critical Solution Coexistence Curve and Physical Properties (Density, Viscosity, Surface Tension, and Interfacial Tension) of 2,6-Lutidine + Water", J. Chem. Eng. Data, 1993, 38 (4), 516-619. https://doi.org/10.1021/je00012a008.
Hansen et al., "A rescaled MSA structure factor for dilute charged colloid dispersions", Mol. Phys., 1982, 46 (3), 651-656, https://doi.org/10.1080/00268978200101471.
Hayter et al., "An analytic structure factor for macroion solutions", Mol. Phys., 1981, 42 (1), 109-118, https://doi.org/10.1080/00268978100100091.
Iwata et al., "Bio-Inspired Bright Structurally Colored Colloidal Amorphous Array Enhanced by Controlling Thickness and Black Background", Adv. Mater., 2017, 29, 1606050, https://doi.org/10.1002/adma.201605050, 8 pages.
Jayalakshmi et al., "Behavior of density and refractive index in mixtures of 2,6-lutidine and water", J. Chem. Phys., 1994, 100 (1), 604-609, https://doi.org/10.1063/1.466921, 6 pages.
Jo et al., "Multiscale Phase Separations for Hierarchically Ordered Macro/Mesostructured Metal Oxides", Adv. Mater., 2018, 30, 1703829, https://doi.org/10.1002/adma.201703829, 8 pages.
Kinkead et al., "Bicontinuous Intraphase Jammed Emulsion Gels: A New Soft Material Enabling Direct Isolation of Co-Continuous Hierarchical Porous Materials", Chem. Mater., 2019, 31, 7601-7607, https://doi.org/10.1021/acs.chemmater.9b02398.
Lee et al., "Bicontinuous Macroporous Materials from Bijel Templates", Adv. Mater., 2010, 22 (43), 4836-4841. https://doi.org/10.1002/adma.201001696.
Lee et al., "Making a Robust Interfacial Scaffold: Bijel Rheology and Its Link to Processability", Adv. Funct. Mater. 2013, 23 (4), 417-423. https://doi.org/10.1002/adfm.201201090.
Li et al., "Kinetically Trapped Co-continuous Polymer Morphologies through Intraphase Gelation of Nanoparticles", Nano Lett., 2011, 11, 1997, https://doi.org/10.1021/nl200366z, 7 pages.
Malitson, I.H., "Interspecimen Comparison of the Refractive Index of Fused Silica", J Opt Soc Am [Internet]. Oct. 1, 1965;55(10):1205, https:/www.osapublishing.org/abstract.cfm?URI=josa-55-10-1206, 5 pages.
Nosonovsky et al., "Phase behavior of capillary bridges: towards nanoscale water phase diagram", Phys. Chem. Chem. Phys., 2008, 10, 2137, https://doi.org/10.1039/B801119M, 8 pages.
Wuttig et al., "Phase-change materials for non-volatile photonic applications", Nat. Photonics, 2017, 11, 485-476, https://www.nature.com/articles/nphoton.2017.126#citeas.
Schubert et al., "Small angle neutron scattering near Lifshitz lines: Transition from weakly structured mixtures to microemulsions", J. Chem. Phys., 1994, 101 (6), 5343-5355, https://doi.org/10.1063/1.467387.
Stratford et al., "Colloidal Jamming at Interfaces: A Route to Fluid-Bicontinuous Gels", Science, 2005, 309, 2198-2201, https://doi.org/10.1126/science.1116589.
Tavacoli et al., "Novel, Robust, and Versatile Bijels of Nitromethane, Ethanediol, and Colloidal Silica: Capsules. Sub-Ten-Micrometer Domains, and Mechanical Properties", Adv. Funct. Mater. 21, 2011, 2020-2027, https://doi.org/10.1002/adfm.201002562.
Teubner et al., "Origin of the scattering peak microemulsions", J. Chem. Phys., 1987, 87 (5), 3195-3200, https://doi.org/10.1063/1.453006.
Wang et al., "Normally Transparent Tribo-Induced Smart Window", ACS Nano, 2020, 14, 3630-3639, https://doi.org/10.1021/acsnano.0c00107.
Witt et al., "Bijel Reinforcement by Droplet Bridging: A Route to Bicontinuous Materials with Large Domains", Soft Matter, 2013, 9 (29), 6773. https://doi.org/10.1039/c3sm00130j, 8 pages.
"American Conference on Neutron Scattering", Jul. 10, 2020, https://www.mrs.org/acns-2020/live-streaming-presentations/invited-speakers, 2 pages.
AIChE, "40c—A New Class of Colloidal Gel Based on the Solvent Segregation Assisted Particle Self-Assembly", Hyatt Regency Orlando, Nov. 10, 2019, downloaded from https://aiche.confex.com/aiche/2019/meetingapp.cgi/Paper/577027, Sep. 24, 2021, 5 pages.

(56) References Cited

OTHER PUBLICATIONS

Bai et al., "Dynamics and Rheology of nonpolar bijels", Soft Matter, https://pubs.rsc.org/en/content/articlelanding/2015/sm/c5sm00994d#, May 31, 2015, 33 pages.

Barker et al., "Design and Performance of a Thermal-Neutron Double-Crystal Diffractometer for USANS at NIST", J. Appl. Crystallogr. 2005, 38 (6), 1004-1011, https://doi.org/10.1107/S0021889805032103.

Bertrand et al., "Direct observation of critical adsorption on colloidal particles", J. Chem. Phys., 143, 084704 (2015), 6 pages, https://tsapps.nist.gov/publication/get_pdf.cfm?pub_id=918811.

Blagodatski et al., "Diverse set of Turing nanopatterns coat corneae across insect lineages", Proc. Natl. Acad. Sci., 2015, 112 (4), 10750-10755, https://www.jstor.org/stable/e26463992.

Burg et al., "Self assembling structural colour in nature", J. Phys. Condens. Matter 2018, 30, 413001, 21 pages, https://iopscience.iop.org/article/10.1088/1361-648X/aadc95/pdf.

Cai et al., "Bijels formed by direct mixing", Soft Matter, 2017, 13, 4824-4829, https://pubs.rsc.org/en/content/articlelanding/2017/SM/C7SM00897J.

Cai et al., "Stabilizing bijels using a mixture of fumed silica nanoparticles", Chem. Commun., 2015, 51, 16984-16987, https://pubs.rsc.org/en/content/articlelanding/2015/cc/c5cc07346d#!.

Castles et al., "Stretchable liquid crystal blue-gels", Nat. Mater., 2014, 13, 817-821, https://www.nature.com/articles/nmat3993.

Choi et al., "Modifying hydrogen bonding interaction in solvent and dispersion of ZnO nanoparticles: impact on the photovoltaic performance of inverted organic solar cells", RSC Adv., 2014, 4, 7160, 7 pages, https://pubs.rsc.org/en/content/articlelanding/2014/ra/c3ra46895j#!.

Clegg et al., "Emulsification of Partially Miscible Liquids Using Colloidal Particles: Nonspherical and Extended Domain Structures", Langmuir, 2007, 23, 5984-5994, https://doi.org/10.1021/la0637071.

Di Vitantonio et al., "Robust Bijels for Reactive Separation via Silica-Reinforced Nanoparticle Layers", ACS Nano 13, 2019, 26-31, https://doi.org/10.1021/acsnano.8b05718.

Endo et al., "Effect of amphiphilic block copolymers on the structure and phase behavior of oil-water-surfactant mixtures", J. Chem. Phys. 2001, 115, 580-600, https://www.researchgate.net/publication/234996128.

Forster et al., "Biomimetic isotropic nanostructures for structural coloration", Adv. Mater. 22, 2010, 2939, https://doi.org/10.1002/adma.200903693, 6 pages.

Gambassi et al., "Critical Casimir effect in classical binary liquid mixtures", Phys. Rev. 2009, E 80, 061143, https://pubmed.ncbi.nlm.nih.gov/20365154/, 30 pages.

Gildas et al., "Review of nanostructure color fiters", J. Nanophotonics 2013, 13, 1, https://www.spiedigitallibrary.org/journals/journal-of-nanophotonics/volume-13/issue-2/020901-Review-of-nanostructure-color-filters/10.1117/1.JNP.13.020901.pdf, 27 pages.

Glinka et al., "The 30 m Small-Angle Neutron Scattering Instruments at the National Institute of Standards and Technology", J. Appl. Crystallogr. 1998, 31, 30-445, https://doi.org/10.1107/S0021889897017020.

Goodling et al., "Colouration by total internal reflection and interference at microscale concave interfaces", Nature 566, 2019, 523-627, https://doi.org/10.1107/S0021889897017020.

Guo et al., "Nanoparticle separation based on size-dependent aggregation of nanoparticles due to the critical Casimir effect", Soft Matter 14, 2018, 1311-1318, http://www.rsc.org/suppdata/c7/sm/c7sm01971h/c7sm01971h1.pdf.

Haase et al., "Continuous Fabrication of Hierarchical and Asymmetric Bijel Microparticles, Fibers, and Membranes by Solvent Transfer-Induced Phase Separation (STRIPS)", Adv. Mater. 27, 2015, 7065-7071, https://doi.org/10.1002/adma.201503509.

Haase et al., "Multifunctional nanocomposite hollow fiber membranes by solvent transfer induced phase separation", Nat. Commun., 2017, 8, 1234, 7 pages, https://doi.org/10.1038/s41467-017-01409-3.

Hertlein et al., "Direct measurement of critical Casimir forces", Nature, 2008, 451, 172-175, https://kops.uni-konstanz.de/bitstream/123456789/39564/1/Hertlein_0-414925.pdf.

Herzig et al., "Bicontinuous emulsions stabilized soley by colloidal particles", Nat. Mater., 2007, 6, 966-971, https://doi.org/10.1038/nmat2055.

Hosseini et al., "An optoelectronic framework enabled by low-dimensional phase-change films", Nature, 2014, 511, 206-211, https://doi.org/10.1038/nature13487.

Huang et al., "Bicontinuous structured liquids with sub-micrometre domains using nanoparticle surfactants", Nat. Nanotechnol., 2017, 12, 1060-1064, https://www.nature.com/articles/nnano.2017.182#citeas.

Ilavsky et al., "Irena: Tool suite for modeling and analysis of small-angle scattering", J. Appl. Crystallogr., 2009, 42, 347-353, https://doi.org/10.1107/S0021889809002222.

Ilavsky et al., "Ultra-small-angle X-ray scattering at the Advanced Photon Source", J. Appl. Crystallogr., 2009, 42, 469-479, https://tsapps.nist.gov/publicatiion/get_pdf.cfm?pub_id=854464.

International Preliminary Report on Patentability for International Application No. PCT/US2021/070989, dated Jan. 31, 2023, 10 pages.

International Search Report and Written Opinion for International Application No. PCT/US2021/070989, dated Dec. 21, 2021, 13 pages.

Jin et al., "Thermoresponsive Stability of Colloids in Butyl Acetate/Ethanol Binary Solvent Realized by Grafting Linear Acrylate Copolymers", Langmuir, 2017, https://doi.org/10.1021/acs.langmuir.7b00301, 7 pages.

Kline, S., "Reduction and Analysis of SANS and USANS Data Using IGOR Pro", J. Appl. Crystallogr., 2006, 39 (6), 895-900, https://doi.org/10.1107/S0021889808035059.

Koos et al., "Capillary Forces in Suspension Rheology", Science, 2011, 331, 897-900, https://doi.org/10.1126/science.1199243.

Li et al., "Broadband Light Management Thermochromic Hydrogel Microparticles for Smart Windows", Joule, 2019, 3, 290-302, https://doi.org/10.1016/j.joule.2018.10.019.

Liu et al., "Bio-inspired robust non-iridescent structural color with self-adhesive amorphous colloidal particle arrays", Nanoscale, 2018, 10, 3637, https://doi.org/10.1016/j.matt.2019.08.018, 8 pages.

Liu et al., "Self-assembled colloidal arrays for structural color", Nanoscale Adv., 2019, 1,1672-1685. https://doi.org/10.1039/C8NA00328A.

Liu et al., "Tunable Structural Color Patterns Based on the Visible-Light-Responsive Dynamic Diselenide Metathesis", Adv. Mater. 2020, 32, 1907569, https://www.ncbi.nlm.nih.gov/pubmed/32027061, 8 pages.

Mandel et al., "Hierarchically Porous Polymer Coatings for Highly Efficient Passive Daytime Radiative Cooling", Science 2018, 362, 315-319, https://doi.org/10.1126/science.aal9513.

Ohtsuka et al., "Thermally Tunable Hydrogels Displaying Angle-Independent Structural Colors", Angew. Chemie Int. Ed., 2015, 54, 15368-1537, https://doi/org/10.1002%2Fanie.201507503.

Okamoto et al., "Casimir amplitudes and capillary condensation of near-critical fluids between parallel plates: Renormalized local functional theory", J. Chem. Phys., 2012, 136 (11), 114704, https://doi.org/10.1063/1.3693331, 16 pages.

Paladugu et al., "Nonadditivity of critical Casimir forces", Nature Communications, 2015, 7 (1), 11403, https://www.nature.com/articles/ncomms11403, 8 pages.

Park et al., "Full-Spectrum Photonic Pigments with Non-Iridescent Structural Colors through Colloidal Assembly", Angew. Chemie Int. Ed., 2014, 53 (11), 2899-2903, https://doi.org/10.1002/anie.201309306.

Reeves et al., "Particle-size effects in the formation of bicontinuous Pickering emulsions", Phys. Rev. E, 2015, 92, 032308, https://doi.org/10.1103/PhysRevE.92.032308, 9 pages.

Schneider et al., "NIH Image to ImageJ: 25 years of image analysis", Nat. Methods, 2012, 9 (7), 671-675, https://doi.org/10.1038/nmet.2089.

Thorson et al., "Composite Bijel-Templated Hydrogels for Cell Delivery", ACS Biomater. Sci. Eng. 2018, 4 (2), 587-594, https://doi.org/10.1021/acsbiomaterials.7b00809.

(56) References Cited

OTHER PUBLICATIONS

Vignolini et al. for "Analysing photonic structures in plants", J. R. Soc. Interface, 2013, 10, 20130394, https://www.researchgate.net/publication/251877347_Analysing_photonic_structures_in_plants, (2013), 9 pages.

Vogel et al., "Color from hierarchy: Diverse optical properties of micron-sized spherical colloidal assemblies", Proc. Natl. Acad. Sci., 2015, 112 (36), 10845-10850, https://doi.org/10.1073%2Fpnas.1506272112.

Wang et al., "Investigating the Effective Interaction between Silica Colloidal Particles near the Critical Point of a Binary Solvent by Small Angle Neutron Scattering", J. Chem. Phys., 2018, 149 (8), 084905, https://doi.org/10.1063/1.5038937, 10 pages.

Wang et al., "Modulation of Multiscale 3D Lattices through Conformational Control: Painting Silk Inverse Opals with Water and Light", Adv. Mater., 2017, 29, 1702769, https://doi.org/10.1002/adma.201702769, 10 pages.

Wang et al., "Switchable Materials for Smart Windows", Annu. Rev. Chem. Biomol. Eng., 2016, 7, 283-304, https://doi.org/10.1146/annurev-chembioeng-080615-034647.

\* cited by examiner

METHOD TO THERMO-REVERSIBLY CONTROL LIGHT AND HEAT FLOW WITH BICONTINUOUS MICRO-DOMAIN

CROSS-REFERENCE TO RELATED APPLICATIONS

This application is a national stage application under 35 U.S.C. § 371 of International Application No. PCT/US2021/070989, filed on Jul. 27, 2021, which claims priority to U.S. Provisional Patent Application Nos. 63/056,794, filed on Jul. 27, 2020 and 63/171,139, filed on Apr. 6, 2021, the entire disclosures of each of these applications being incorporated herein by reference in their entireties for all purposes.

STATEMENT REGARDING FEDERALLY SPONSORED RESEARCH

This invention was made with government support under Cooperative Agreement Nos. 70NANB12H239 and 70NANB10H256 of the National Institute of Standards and Technology. The government has certain rights in the invention.

BACKGROUND OF THE INVENTION

Colloidal self-assembly can form fascinating structures through either equilibrium or non-equilibrium routes. Gel formation, a non-equilibrium approach, shows tremendous usefulness to form novel structures not achievable with traditional equilibrium approach. In particular, the formation of bicontinuous structures through gelation processes has attracted extensive research interests due to their applications in energy storage, membrane science, flow-through reaction, and cell delivery. One of the widely studied bicontinuous structure systems is the bicontinuous interfacially jammed emulsion gel (Bijel), which can form porous materials with tortuous channels by arresting the solvent spinodal decomposition with colloidal particles trapped at the interface of two phase-separating solvents. However, as non-equilibrium structures are process-dependent, it is very challenging to simultaneously achieve reversibility, reproducibility, scalability, and tunability over material structures and properties. For example, for Bijel systems, the required fast quenching rate (from a few to tens of degrees per minute) has been restricting its scalability and thermal reproducibility. Extensive works have been focused on simplifying the experimental requirements of Bijel systems, improving their large-scale processability, boosting the versatility and enhancing the control over domain size.

Furthermore, various photonic devices have been developed during the recent years, including smart windows, optical switches/filters, displays, and memories, all of which harness light-matter interactions. Their physical interference could result in coloration through absorption, transmission and scattering. Light absorption (e.g. pigment) is commonly used to select or filter out certain wavelength of light. However, it often involves toxic material and suffers from photo-degradation. In addition, heat generated through absorption is also detrimental to thermal management.

Structural color, resulting from light scattering, is one of the major components that form the color palettes of nature, such as bird feathers, beetle scales, flower petals and plant fruits. By mimicking nature, man-made structural color can be originated from photonic crystalline structures (PCSs) and photonic amorphous structures (PASs). Compared to PCSs, PASs lack of long-range order and exhibit less angle-dependent colors (non-iridescence). Typically, the length scale of short-range order is defined by the size of solid building blocks (i.e. particles). They are usually particles of a few hundred nanometers similar to the wavelength of visible light. By changing the size of the particles, the specific wavelength of light that interacts with the structure is altered, thus the sample could exhibit different colors. As PASs show angle-independent structural color, great efforts have been made to create real "amorphous" structure to suppress Bragg scattering. Intentional incorporation of particles with different sizes, fast infiltration, evaporation, introducing opposite charged layers, and growth of soft shells are all utilized to disrupt long-range order. Recently, Goodling, A. E. et al. (*Nature* 566, 523-527 (2019)) proposed a new mechanism to produce iridescent colors through total internal reflection with macroemulsions. Still, it is relatively rare to achieve structural color with micro-domains.

Controlling light transmission, on the other hand, leads to important applications, such as smart windows, optical filters and displays. Traditional smart window and optical filter technologies largely depend on light absorption of materials. Recent developments, however, start to favor structural color filtration. As such, scattering based smart windows/coatings, as well as Fabry-Pperot nanocavities, liquid crystal filters, semiconductor fibers plasmonic and metamaterial filters are developed. Similar to structural color, effective management of visible light transmission often requires structure size or periodicity to be similar to the wavelength of visible light.

There are intrinsic limitations associated with the current techniques, such as high fabrication cost involving multi-step of lithography, lack of control over the wavelength of light (color clarity), as well as the difficulty in achieving dynamic tunability. For structural scattering and transmission, the most widely used way to realize in-situ light management is by introducing stimuli-responsive macromolecules to dynamically change certain repeating distances. As a result, the unique response of polymers to stretching, temperature, moisture/UV, and PH can be directly translated to color change. However, alternative approach to realize dynamical tunability have not been reported before.

Hence, there is a need to develop a new mechanism to thermo-reversibly manage light transmission and scattering and a general method to achieve dynamical optical modulation and allows customization on the transition temperature.

SUMMARY OF THE INVENTION

Disclosed herein is a colloidal composition that can form bicontinuous structures in a gel state, referred to herein as a solvent segregation driven gel (SeedGel embodiment™). Similar to Bijel, colloidal particles dispersed in a binary solvent are used in the compositions for the SeedGel embodiments of the present disclosure. However, unlike Bijel systems as shown in FIG. 1A, particles in a SeedGel embodiment, as illustrated in FIG. 1B, are jammed within one solvent domain due to preferential wetting of particles by one component of the binary solvent upon solvent phase separation. It should be noted that realizing bicontinuous structures with particles constraint within one of the liquid domains has been previously proposed in polymer blends and bicontinuous intraphase jammed emulsion gels (bipjel). However, there are major distinctions between SeedGel embodiments of the present disclosure and the previous demonstrations. Whereas a strong attractive force between particles is needed for previous systems, the particles in a SeedGel embodiment have a net repulsion or no attraction between them in liquid states. In addition, SeedGel embodiment formation is driven by the local phase separation of solvents while the bulk solvent phase separation is required in the intraphase gelation of the previous Bijel systems. These distinctions provide SeedGel embodiments with many unique and interesting properties. The structural arrest of particles in one solvent domain of a SeedGel embodiment leads to the gel formation with great reversibility, reproducibility, scalability, and tunability. Compared to Bijel, SeedGel embodiments provide an alternative way to arrest bicontinuous structures by removing the often non-trivial surface treatment of particles, reducing the rigid requirement of fast quenching rate by orders of magnitude, allowing adjustable gelation temperature and domain size, and can easily incorporate particles as small as 10 nm. In addition, the use of the binary solvent offers SeedGel embodiments a unique opportunity to tune the optical property that is not achievable by many other gel systems.

In a composition for the SeedGel embodiment, particles interact with a repulsive potential in the liquid state far away from the gel transition temperature so that the formed SeedGel embodiment can thermo-reversibly change from liquid state to gel state, and vice versa. By increasing the temperature, the solvent fluctuation induced attraction becomes larger. At a high enough temperature, the particles in a SeedGel embodiment are assembled by the attraction induced by local solvent phase separation due to preferential wetting of the particle surface by one component of the binary solvents. This SeedGel embodiment is thus driven by the local solvent segregation that results in a gelation transition temperature much lower than the critical temperature of the binary solvent. Hence, the quenching temperature can be set in the single-phase region of the binary solvent system before reaching the critical point of the binary solvent. Besides, the SeedGel embodiment enables quasistatic ramping and promises large-scale processability. A slow temperature ramping of SeedGel embodiment formation renders more opportunities to engineer the bicontinuous structures. It should be noted that this is different from some other attempts to jam particles in either binary solvents or polymer systems, for which there is a strong attraction between particles.

In an aspect of the present invention, a SeedGel embodiment formation is demonstrated hereinbelow using exemplary compositions with charged silica nanoparticles in the water/lutidine binary solvent. Additionally, disclosed herein are the factors controlling the domain structure of the SeedGel embodiment system, including but not limited to, particle concentration, solvent composition, temperature ramping rate, quenching depth of the final temperature. The phase diagram of the exemplary composition for the SeedGel embodiment formation is also disclosed hereinbelow. Without wishing to be bound by any particular theory, it is believed that these results will help to optimize the experimental conditions to achieve the desired bicontinuous structures of SeedGel embodiment systems for different applications.

Disclosed herein is a novel solvent segregation driven gel (SeedGel embodiment) comprising bicontinuous structures with excellent thermal structural reversibility and reproducibility, tunable domain size, adjustable gel transition temperature, and amazing optical properties. It is achieved by trapping nanoparticles into one of the solvent domains upon the phase separation of the binary solvent. Due to the universality of the solvent driven particle phase separation, SeedGel embodiment is thus potentially a generic method for a wide range of colloidal systems.

Another aspect of the present invention, includes a new method to efficiently control the flow of visible light and heat (infrared radiation) through the control of the solvent distribution in a new colloidal gel, which is made of nanoparticles with a binary solvent. The properties of materials prepared with this method are thermo-reversibly controllable through temperature. The light transmission is tunable over a wide range of wavelength, from ultraviolet (~200 nm) to infrared (~2400 nm). As a consequence, the color of the materials is also adjustable by temperature. The working temperature range can be adjusted at will by tuning the solvent properties. And the process is economical and scalable. Thus, it is an excellent candidate for climate adaptive building shells to passively manage daytime light without requiring additional energy input, for smart filters to select wavelength favorable for crop growth in green houses, and for shields of automobiles to avoid unwanted overheating. Additionally, it can be used as a thermochromic material for temperature sensor as well.

Another aspect of the invention includes a method and related materials for thermo-reversibly manipulating the transmission of light/heat over a wide range of light wavelength (200 nm to 2400 nm), realized by the structural arrangement of the binary solvent in a SeedGel embodiments. The solid framework of the colloidal gel provides a platform to stabilize a unique and tunable structure of the relative distribution of the two components of the binary solvent. This method, and consequently its applications, arise from structures formed by the binary liquid, as compared to mainstream techniques that realize structural color with solid building blocks. Unlike thermochromic liquid crystal, the liquid structure of SeedGel embodiments is amorphous and no ordered liquid molecule packing is observed. The material exhibits 'smart' color change in response to the temperature without additional energy input. The temperature change is rapid and sensitive that the transmission could be altered within a couple tenth of a degree. As the light manipulation is originated from scattering of the structure, this new type of material is inherently resistive to the light-induced degradation commonly seen in pigments or dyes. The stimuli-responsiveness and the ability that allows temperature range customization make it a versatile method to achieve 'smart' control of light for a variety of applications.

The mechanism for filtering light/heat is due to the different wavelength dependence of the refractive index of two micrometer-sized domains, a particle micro-domain and a solvent micro-domain, formed in the SeedGel. The refractive index of each domain is adjusted by the temperature, as the temperature can alter the solvent composition in each domain without affecting the domain structures. The change of the solvent composition in each domain can be reversibly controlled by the temperature. Exemplary compositions comprising silica nanoparticle dispersion in a partially miscible binary solvent system, such as water/lutidine, are used herein to demonstrate the feasibility of this method. The particles are tuned so that they are preferentially wetted by one of the components in the binary solvent. The temperature change induces local phase separation of the two solvent molecules in the vicinity of the particles, which introduces an effective attraction between particles. Further heating up the sample increases the attraction strength between particles so that the nanoparticles percolate through the system to form a gel with bicontinuous domains. With different wavelength dependences of the refractive index for each domain, the refractive index of these two domains are only matched at a specific wavelength. The light with the wavelength close to the matched wavelength is allowed to pass through the sample while all other light is scattered away and cannot pass through the sample. By changing the temperature, the solvent composition in both domains can be exchanged, resulting in the change of refractive index of each domain and the shift of the light wavelength that can match the refractive index between two domains. The shift of the matched wavelength as a function of temperature thus offers the control of the wavelength of light that can pass through the sample. As the phase separation temperature can be adjusted by using different binary solvents, the gelation transition temperature can be tuned. Hence, the working temperature range for a sample for the light transmission can be controlled.

According to an aspect of the present invention, disclosed herein is a method and a class of material for generating structural color that can be used in many fields. Structural color is widely observed in nature and is known to be non-fading, environmental-friendly and exhibit a broad range of coloration. It is of great interest to explore new approach that is economical and scalable. The fast and sensitive response of the SeedGel embodiments of the present invention directly makes the material a temperature sensor to detect subtle temperature changes. The transmission of the light/heat can be dynamically changed in response to the temperature variation during the day. It can 'smartly' monitor the temperature of a confined space without additional input of electricity by switching off the heat flow beyond a certain point. Importantly, this transition temperature can be adjusted at will.

Disclosed herein is a method to realize structural color with dynamic tunability in the SeedGel embodiments of the present invention in a bottom-up approach. In embodiments of the present invention, tunability does not originate from size change of the structures, but from wavelength selective scattering based on refractive index matching by binary solvents. High color clarity is demonstrated and the temperature range for color transition can be customized. It is a general mechanism that allows large scale processability in a broad range of fields, including optics, displays, sensors, filters, and smart windows.

In an aspect of the present invention, there is provided a composition comprising an effective amount of nanoparticles dispersed homogeneously in a binary-solvent system comprising a first solvent and a second solvent, the binary solvent system being a single-phase, in a liquid state at or below a first temperature;
wherein the nanoparticles have a preferential wettability to the first solvent,
wherein the composition is disposed, upon changing from the first temperature, to transition thermo-reversibly from the liquid state to a gel state,
wherein the gel state comprises bi-continuous domains including a particle domain and a solvent domain, and
wherein the particle domain comprises nanoparticles dispersed in a first-solvent-rich fraction of the binary solvent system and the solvent domain comprises a second-solvent-rich fraction of the binary solvent system. In an embodiment, the step of changing the temperature of the composition from the first temperature comprises heating the composition above the first temperature. In another embodiment, the step of changing the temperature of the composition from the first temperature comprises lowering the temperature of the composition below the first temperature.

In an embodiment, the size of each of the particle micro-domain and the solvent micro-domain is dependent upon a temperature ramping rate of the thermo-reversible transition of the composition from the liquid state to the gel state.

In yet another embodiment, each of the particle micro-domain and the solvent micro-domain have a different refractive index dependence on wavelength, and wherein the refractive index of the particle micro-domain matches with that of the solvent micro-domain for an identified wavelength at an identified temperature, whereby the composition becomes transparent to the identified wavelength at the identified temperature In yet another embodiment, the composition in the gel state has tunable wavelength-dependent properties for a range of wavelengths as a function of temperature, wherein the wavelength-dependent properties comprise one or more of: scattering and transmittance. The wavelength can be in the range of 200 nm to 2400 nm.

In an embodiment, the binary solvent system of the said composition comprises one of the following mixtures of solvents:
(i) Water, deuterated water, or partially deuterated water and methylpyridine, dimethyl pyridine, deuterated or partially deuterated methylpyridine, deuterated or partially deuterated dimethylpyridine, or isomers thereof;
(ii) water and methyl ethyl ketone;
(iii) an alcohol and an alkane;
(iv) ethylene carbonate and p-xylene;
(v) ethylene glycol and nitromethane; or
(vi) cyclohexane and nitromethane.

The binary solvent system of alcohol and alkane may include any suitable alkane such as, methanol, ethanol, and propanol. Suitable alcohols include, but are not limited to pentane, hexane, heptane, octane, nonane, decane, undecane, and dodecane. In an embodiment, the binary solvent system may comprise:
(i) methanol, deuterated methanol, or a partially deuterated methanol, and
(ii) hexane, deuterated hexane, or a partially deuterated hexane.

In another embodiment, the binary solvent system may comprise:
(i) ethanol, deuterated ethanol, a partially deuterated ethanol, and
(ii) dodecane, deuterated dodecane, or a partially deuterated dodecane.

In an embodiment, the nanoparticles have an average particle diameter in the range of from 5 nm to 100 nm or from 7 nm to 75 nm, or from 8 nm to 50 nm. In another embodiment, the nanoparticles are charged silica nanoparticles, having an average particle diameter of about 30 nm or about 27 nm, and the silica nanoparticles are dispersed in an amount of 5% to 50%, or 7.5% to 45%, or 9% to 30%, by volume in the binary solvent system of water and/or partially deuterated water, and methylpyridine, deuterated methylpyridine, partially deuterated methylpyridine, dimethyl pyridine, deuterated dimethylpyridine, partially deuterated methylpyridine, and/or their isomers, based on the total volume of the composition.

In another aspect, there is provided a device comprising the said composition. The device can comprise a filter, a temperature sensor, a smart window, a smart display, a battery, or a tissue growth scaffold.

In an aspect, there is provided a method of dynamically tuning radiation transmission comprising providing the composition, as disclosed hereinabove, in the gel state, and changing a temperature of the composition to thermo-reversibly modify peak radiation transmission at a first wavelength transmissivity from having high transmissivity at a range of wavelength at a first temperature to having a second wavelength transmissivity less than the first transmissivity at a second temperature. The range of the wavelength with high transmissivity can be adjusted by temperature.

In another aspect of the invention, there is provided method of thermo-reversibly controlling operation of a filter, the method comprising providing a filter having the composition, as disclosed hereinabove, in a liquid state and adjusting the temperature ramping rate of the thermo-reversible transition of the composition from the liquid state to the gel state, to thereby control operation of the filter. In an embodiment, the method comprises operating the filter to selectively filter or block radiation.

In an embodiment, the filter has a pore size defined by the two micro-domains, the method comprising tuning the pore size by controlling the size of the two micro domains by adjusting the temperature ramping rate.

In another embodiment, the method comprises operating the filter to selectively filter or block a component of a fluid. The fluid may comprise a solid/liquid system, solid/gas system, or a liquid/liquid system.

In an aspect, there is a method of tuning radiation transmission comprising:
(i) providing a composition comprising microparticles dispersed in a binary solvent system, wherein a refractive index of the binary solvent system is close to that of the plurality of microparticles, and
(ii) tuning the transmission of radiation through the composition by changing a solvent fraction of the two solvents of the binary solvent system, wherein the microparticles and the binary solvent system have different dependence of their respective refractive index on wavelength, and
wherein the refractive index of the microparticles matches with that of the binary solvent system at certain compositions of the binary solvent system.

In an embodiment of the method, the binary solvent system comprises toluene and n-hexane. In another embodiment, the binary solvent system comprises a first solvent present in an amount of 45 to 65%, by weight, based on the total weight of the binary solvent system. In an embodiment, the microparticles have an average particle diameter in the range of from 1 μm to 12 μm.

DETAILED DESCRIPTION OF THE INVENTION

Figure 1A:
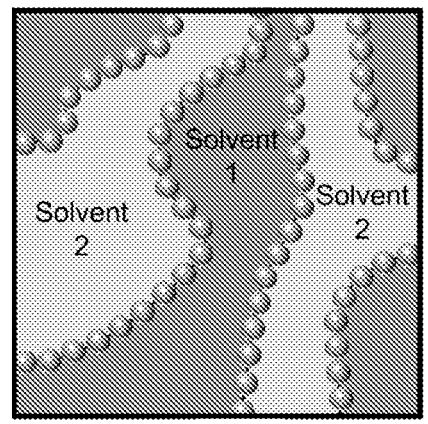
FIG. 1A: Schematic illustration of a Bijel (Prior art) utilizing particles that wet both solvents equally (different solvent regions are defined by colors).

As used herein, the term "SeedGel embodiment" refers to the solvent segregation driven gel state of the composition of the present invention.

As used herein, the term "water/lutidine" binary solvent system refers to binary solvent systems comprising water and/or partially deuterated water as one solvent and second solvent to include at least one of lutidine and/or its isomers; or deuterated or partially deuterated lutidine and its isomers. For example, as used herein, the binary solvent system of "water/lutidine" may include, but is not limited to, water/2,6-lutidine; water/2,5-lutidine; water/2,4-lutidine; water/2,3-lutidine; water/3,4-lutidine; water/3,5-lutidine; partially deuterated water/2,6-lutidine; partially deuterated water/2,5-lutidine; partially deuterated water/2,4-lutidine; partially deuterated water/2,3-lutidine; partially deuterated water/3,4-lutidine; partially deuterated water/3,5-lutidine; water/deuterated 2,6-lutidine; water/deuterated 2,5-lutidine; water/deuterated 2,4-lutidine; water/deuterated 2,3-lutidine; water/deuterated2,4-lutidine; water/3,5-lutidine; water/partially deuterated 2,6-lutidine; water/partially deuterated 2,5-lutidine; or water/partially deuterated 2,4-lutidine; deuterated water/2,3-lutidine; deuterated water/3,4-lutidine; or deuterated water/3,5-lutidine.

As used herein, the term "alcohol/alkane" binary solvent system refers to binary solvent systems comprising an alcohol, a deuterated alcohol, a partially deuterated alcohol or an isomer thereof as one solvent and second solvent to include an alkane, a deuterated alkane, a partially deuterated alkane, or an isomer thereof. Suitable examples of alkane include C1-C3 alcohols, such as, methanol, ethanol, and propanol and isomers thereof. Suitable examples of alcohol include C5-C12 alkanes and their isomers, but are not limited to pentane, hexane, heptane, octane, nonane, decane, undecane, dodecane and isomers thereof. For example, the binary solvent system of "alcohol/alkane" may include, but is not limited to, a C1-C3 alcohol/a C5-C12 alkane; a deuterated C1-C3 alcohol/a C5-C12 alkane; a C1-C3 alcohol/a deuterated C5-C12 alkane; a deuterated C1-C3 alcohol/a deuterated C5-C12 alkane; a partially deuterated C1-C3 alcohol/a C5-C12 alkane; a C1-C3 alcohol/a partially deuterated C5-C12 alkane; a partially deuterated C1-C3 alcohol/a partially deuterated C5-C12 alkane; a deuterated C1-C3 alcohol/a partially deuterated C5-C12 alkane; or a partially deuterated C1-C3 alcohol/a deuterated C5-C12 alkane. In an embodiment, the binary solvent system may comprise:

(i) methanol, deuterated methanol, or a partially deuterated methanol, and (ii) hexane, deuterated hexane, or a partially deuterated hexane.

In another embodiment, the binary solvent system may comprise:

(i) ethanol, deuterated ethanol, a partially deuterated ethanol, and (ii) dodecane, deuterated dodecane, or a partially deuterated dodecane.

The present invention discloses bicontinuous porous structures through colloidal assembly realized by non-equilibrium process is crucial to various applications, including water treatment, catalysis and energy storage. Disclosed herein is a novel composition for SeedGel embodiment formation, demonstrated to arrest bicontinuous structures with excellent thermal structural reversibility and reproducibility, tunable domain size, adjustable gel transition temperature, and amazing optical properties. It is achieved by trapping nanoparticles into one of the two solvent domains upon phase separation of the binary solvent. Due to the universality of the solvent driven particle phase separation, SeedGel embodiment is thus potentially a generic method for a wide range of colloidal systems.

Figure 1B:
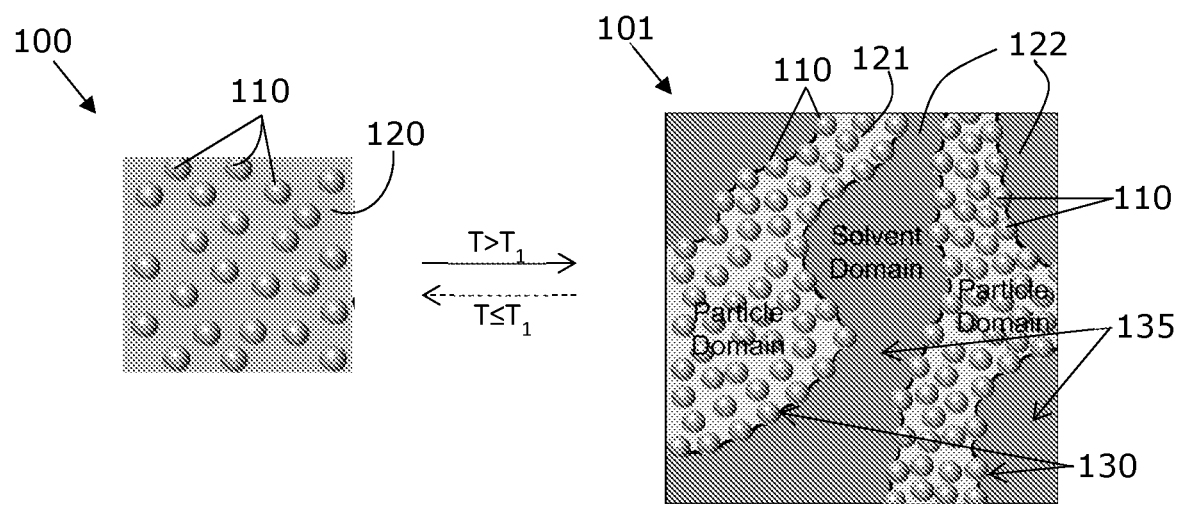
FIG. 1B: Schematic illustration of an exemplary composition for a SeedGel embodiment, which relies on favorable wetting of particles to one component of a binary solvent. Due to this surface wettability difference, particles in Bijel are jammed at the interface and SeedGel embodiment confines particles within one of the solvent regions.

Experiment No. 1: Tunable Thermo-Reversible Bicontinuous Nanoparticle Gel Driven by the Binary Solvent Segregation Thermo-Reversible SeedGel Embodiment using Spherical Silica Particles having 27 nm Diameter FIG. 1B shows a schematic illustration of an exemplary composition comprising an effective amount of nanoparticles 110 dispersed homogeneously in a binary-solvent system 120 comprising a first solvent and a second solvent. At a temperature below a first temperature $T_1$, the binary solvent system 120 is in a single-phase and in a liquid state. The nanoparticles 110 and the binary solvent system 120 are chosen, such that the nanoparticles 110 have a preferential wettability to the first solvent.

As shown in FIG. 1B, when the composition 100 is heated above the first temperature $T_1$, the composition transitions thermo-reversibly from the liquid state 100 to a gel state 101. The gel state 101 comprises bi-continuous domains including a particle domain 130 and a solvent domain 135. As schematically illustrated in FIG. 1B, the particle domain 130 comprises nanoparticles 110 dispersed in a first-solvent-rich fraction 121 of the binary solvent system 120 and the solvent domain 135 comprises a second-solvent-rich fraction 122 of the binary solvent system 120.

Thus, in order to prepare a SeedGel embodiment of the composition, nanoparticles need to be dispersed in a binary solvent system in its single-phase region. By changing the temperature, by heating or cooling, towards the critical temperature of the binary solvent system, a SeedGel embodiment can be formed by jamming nanoparticles in one of the solvent regions. There are two prerequisites for a composition to form a SeedGel embodiment: 1) a binary solvent system that nanoparticles can be dispersed in is at the single-phase region in the liquid state of the binary solvent system, i.e. there is no strong intrinsic attraction between nanoparticles and the nanoparticles are stable in the single-phase region of this binary solvent system; 2) the surface of nanoparticles need to be tuned to strongly favor one component of the binary solvent system.

The thermodynamic origin of the bicontinuous structure formation in SeedGel embodiment is believed to be kinetically arrested spinodal decomposition. Once the particle domain forms, particles prefer to stay in the water-rich domain as water preferentially adsorbs on their surfaces. Within the particle domain, the particles transition into a glassy state that provides the mechanical strength of SeedGel embodiment.

Any suitable nanoparticles may be used, including, but not limited to silica nanoparticles, polystyrene particles, poly(methyl methacrylate) (PMMA) particles, iron oxide nanoparticles, calcium carbonate nanoparticles, and carbon nanoparticles. The nanoparticles can have any suitable average particle diameter, such as in the range of from 5 nm to 100 nm or from 7 nm to 75 nm, or from 8 nm to 50 nm. Additionally, any suitable method can be chosen to make the nanoparticles have affinity to the first solvent, including, but not limited to chemical or physical surface modification of the nanoparticles. For example, in an embodiment of the composition comprising the binary solvent system of water/2,6-lutidine, silica nanoparticles having high surface charge can be used, where the silica nanoparticles have a preferential wettability to water.

Suitable examples of binary solvent system include, but are not limited to,
(i) water, deuterated water, or partially deuterated water and methylpyridine, dimethyl pyridine, deuterated or partially deuterated methylpyridine, deuterated or partially deuterated dimethylpyridine, or isomers thereof;
(ii) water and methyl ethyl ketone;
(iii) an alcohol and an alkane;
(iv) ethylene carbonate and p-xylene;
(v) ethylene glycol and nitromethane; or
(vi) cyclohexane and nitromethane.

In an embodiment, the composition comprising any of the above binary solvent systems (i)-(ii) upon heating above the first temperature T1, thermo-reversibly transitions from the liquid state to a gel state. In an embodiment, the composition comprising any of the above binary solvent systems (i)-(ii) upon cooling below the first temperature T1, thermo-reversibly transitions from the liquid state to a gel state. In another embodiment, the composition comprising any of the above binary solvent systems (iii)-(vi) upon cooling below the first temperature T1, thermo-reversibly transitions from the liquid state to a gel state.

Although examples (ii) and (iii) list specific binary solvent systems comprising an alkane and an alcohol, suitable systems may comprise any suitable alkane and any suitable alcohol for the purpose desired, such as but not limited to binary solvent systems with an alcohol including but not limited to methanol, ethanol, propanol, and isomers thereof and with an alkane including but not limited to C5-C12 alkanes, such as pentane, hexane, heptane, octane, nonane, decane, undecane, dodecane, isomers thereof. The binary solvent system may comprise a deuterated or a partially deuterated derivative of any of these alcohols and alkanes.

In another embodiment of the composition, the nanoparticles may be dispersed in an amount of 5% to 50%, or 7.5% to 45%, or 9% to 30%, by volume in the binary solvent system, based on the total volume of the composition. The composition may include binary solvent system comprising the solvent having no affinity to the nanoparticles in the range of 15% to 50%, or 16% to 45%, or 20% to 42% by mass based on the total mass of the binary solvent system. However, it should be noted that the amount of the nanoparticles and the binary solvent composition present in the composition for the SeedGel embodiment are interdependent and cannot be randomly selected for SeedGel formation.

In an aspect, an exemplary composition of the SeedGel embodiment comprises spherical silica nanoparticles (average diameter of approximately 27 nm) dispersed in a binary solvent system comprising a mixture of water and 2,6-lutidine. The nanoparticles have high surface charge such that its surface is preferentially wetted by water. As a result, the nanoparticles have a net repulsion between them. The solvent ratio in the binary solvent system is adjusted close to critical concentration of the bulk solvent (mass fraction of 28.4% 2,6-lutidine and 71.6% water in the solvent) with the particle volume fraction at 24.3%. This sample is in the liquid state at room temperature (20° C.) and forms a gel (SeedGel embodiment) at higher temperatures.

In an embodiment, silica nanoparticles having an average diameter of 10 nm have a zeta potential in the range of −22 mV to 45 mV or −30 mV to −35 mV. In another embodiment, silica nanoparticles having an average diameter of 27 nm have a zeta potential in the range of −10 mV to 70 mV or −37 mV to −41 mV.

Figure 2A:
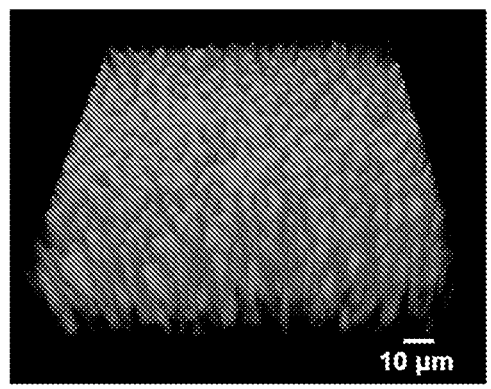
FIG. 2A: A 3-D confocal image of a SeedGel embodiment with a total z-stack of 40 μm. Note that the scale bar is based on the size in the x-y plane.
Figure 2B:
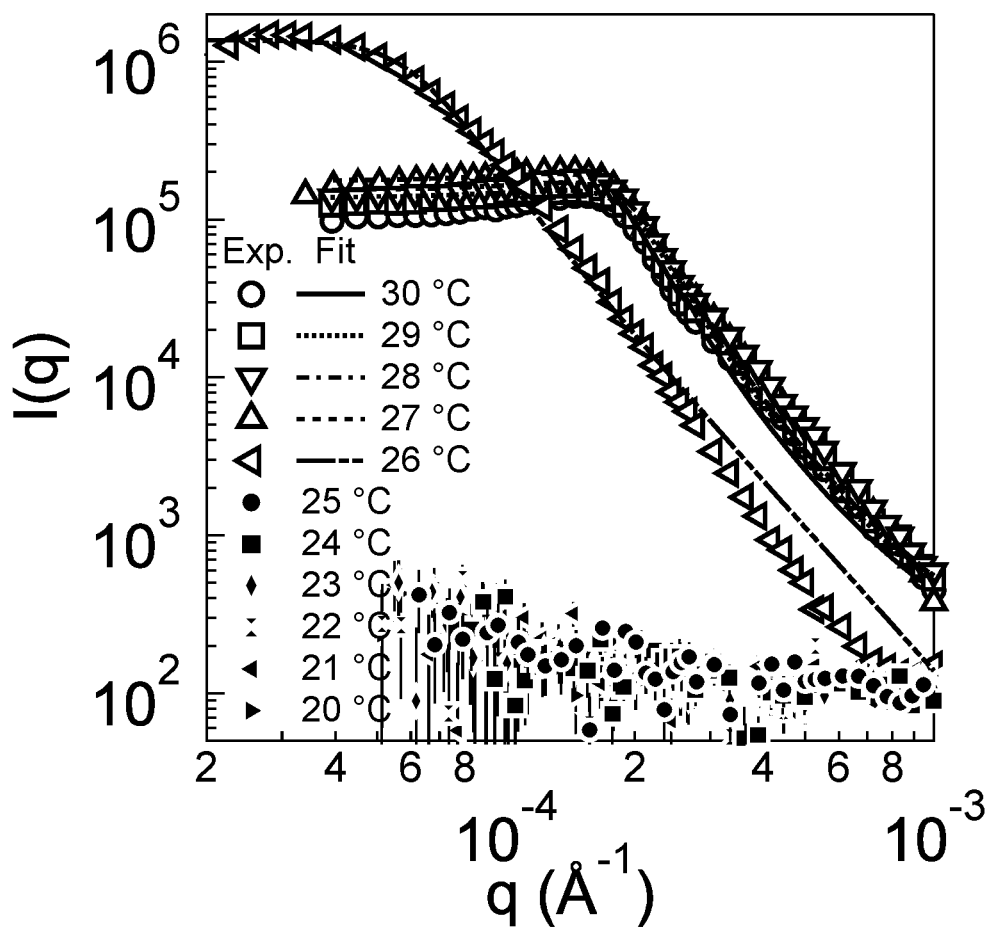
FIG. 2B: A ultra-small angle neutron scattering (USANS) pattern of the gel structure of the SeedGel embodiment at different temperatures by cooling a composition from a gel state (30° C.) (SeedGel embodiment) to a liquid state (20° C.). By fitting the USANS patterns with the Teubner-Strey model, the averaged domain size can be obtained. The error bars in the figures represent one standard deviation and are often smaller than the symbol size.
Figure 2C:
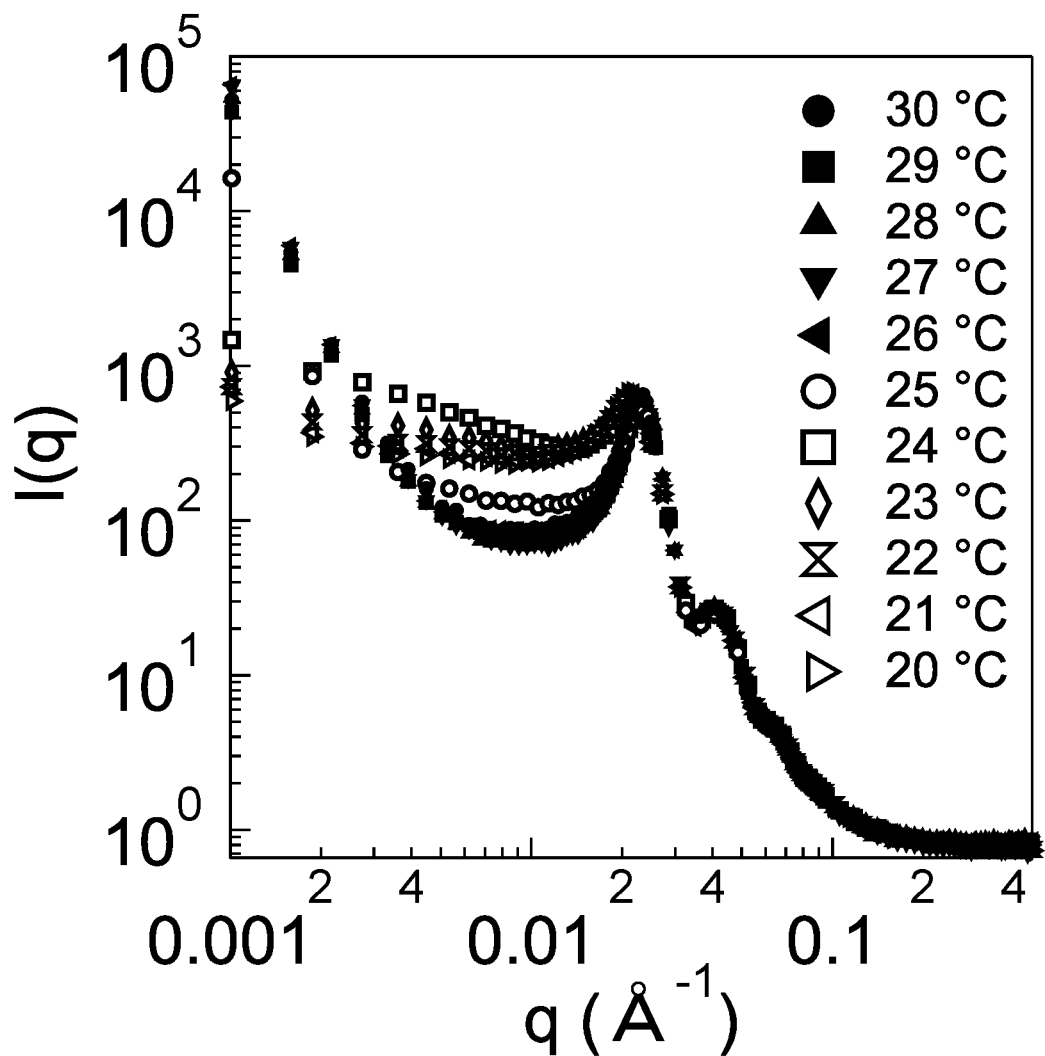
FIG. 2C: A small angle neutron scattering (SANS) pattern of the gel structure of the SeedGel embodiment at different temperatures by cooling a composition from a gel state (SeedGel embodiment) (30° C.) to a liquid state (20° C.).
Figure 3A:
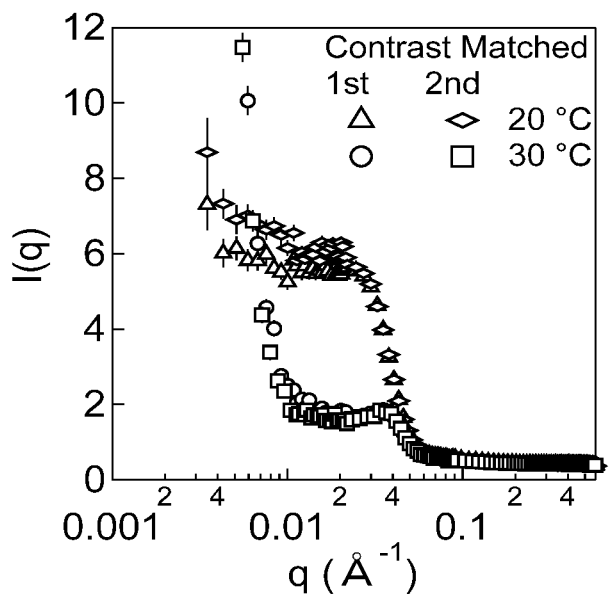
FIG. 3A: A SANS profile of a thermo-reversible SeedGel embodiment of a composition A prepared with 27 nm particles cycling between liquid state (20° C.) and gel state (30° C.). Composition A comprises a specially designed mixture of $H_2O$ and $D_2O$ to contrast match the scattering length density of water phase to that of silica. The error bars represent one standard deviation and are often smaller than the symbol size.
Figure 3C:
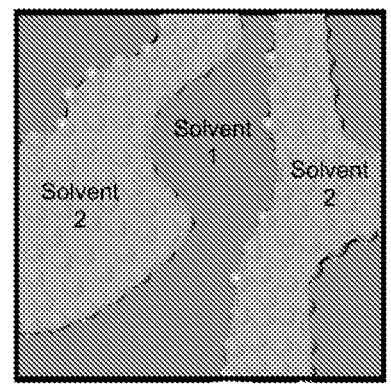
FIG. 3C: A schematic illustration of the case of scattering length density (SLD) of water matched to that of silica as in composition A, corresponding to FIG. 3A.

FIG. 3A shows a 3-D confocal microscope image of the above exemplary composition in the gel state, at a temperature close to 29° C., which shows a tortuous bicontinuous structure with a domain size on the order of a few micrometers. Quantitative temperature-dependent characterizations of the multi-length scale structures were conducted with USANS, as shown in FIG. 2B and (SANS, as shown in FIG. 2C. These scattering patterns are dominated by silica particles since the scattering contrast between silica particles and the solvent is much larger than that between water and 2,6-lutidine. By analyzing the temperature-dependent scattering patterns, particle structures and gel transition temperature can be determined.

The gel state (above 26° C.) of the exemplary composition is indicated by a scattering peak at ~$1.7 \times 10^{-4}$ Å$^{-1}$ in USANS patterns, as shown in FIG. 2B due to the repeating distance between the tortuous particle domains. Reasonably good fit is achieved with the Teubner-Strey model that is widely used to describe the scattering pattern of a bicontinuous structure. (See Supplementary Note 1-1 and Supplementary Table 1-1 for details.) A particle domain size of about 2 μm was obtained for the SeedGel embodiment of this composition with the solvent channel size at around 1 μm at 30° C. consistent with the result of the microscope image shown in FIG. 2A. The solvent channel size can even reach sub-micrometer dimensions, which is comparable to the smallest achievable domain size of Bijel system, schematically shown in FIG. 1A. The gel sample of the exemplary composition consists of two tortuous domains: the particle domain that contains concentrated particles, and the solvent domain that is made of a mixture of water and 2,6-lutidine, as illustrated in FIG. 1B. It should be noted from FIG. 2B that the bicontinuous structure of the gel sample does not change between 30° C. and 27° C. as USANS peak position does not shift in this temperature range.

The gelation temperature of this particular exemplary composition was observed to be around 26° C., which is 8° C. lower than the phase separation temperature of the bulk binary solvent system of about 34° C. This is expected as the gel transition is initiated by the attraction between nanoparticles due to the local phase segregation of the binary solvent system.

Water and 2,6-lutidine are miscible at low temperatures below the critical temperature at about 34° C. of the bulk binary solvent system. Due to the charge repulsion, charged silica nanoparticles are stable in this binary solvent system when it is far away from the gelation temperature. The silica particles are highly charged and have a strong affinity to water over 2,6-lutidine. At elevated temperatures, but before reaching the critical point of the bulk binary solvent system (34° C.), the development of a water-rich layer around particles introduces a solvent triggered attraction between particles. This attraction increases as the system gets close to the gelation temperature, which will eventually dominate the interaction between particles as previously demonstrated. The solvent-induced attraction drives aggregation, and ultimately the SeedGel embodiment formation by forming two distinct bicontinuous domains: one particle domain with particles closely packed within the water-rich solvent, and one solvent domain rich in 2,6-lutidine without particles.

It was found that around the gel transition temperature of the exemplary composition, the particle domain size increases to approximately 7 μm due to the weakened strength of gel resulting in the coarsening of domains. Further cooling down the sample wipes out the scattering peak at low-q region, resulting in the thermo-reversible transition from gel to liquid. In complement to USANS results, SANS patterns were obtained to investigate the local structures of assembled particles upon cooling. In comparison to a broad inter-particle structure factor peak in the liquid state, a much sharper peak at slightly larger q-position appeared in the gel state, indicating that particles are packed much denser in the gel state with smaller average inter-particle distance. The particle local volume fraction in the particle domain was determined to be about 39% in the gel state by fitting the SANS patterns. (See Supplementary Note 1-2 for details.)

A wide range of temperature ramping rates were used to form gel even as low as 0.1° C./min, as discussed hereinbelow, which is in sharp contrast to the fast quenching required by many Bijel systems.

Figure 3B:
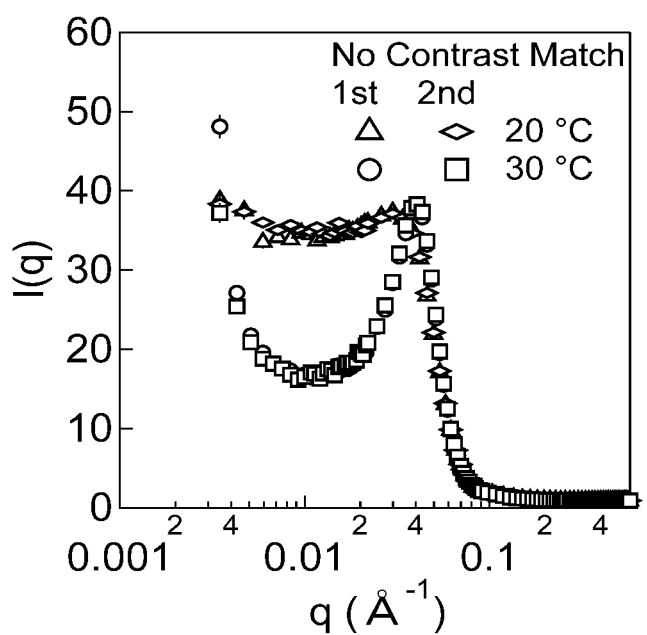
FIG. 3B: A SANS profile of a composition B which uses normal water ($H_2O$) so that silica particles are still visible to neutrons when engulfed by water. The error bars represent one standard deviation and are often smaller than the symbol size.

In the gel state of the exemplary composition, the binary solvent system also separates into two solvent regions commensurate with the observed bicontinuous structure: the water rich solvent region overlapping with the particle domain, and the lutidine rich solvent region coinciding with the solvent domain. Specially designed SANS experiments were used to probe the solvent separation. Two compositions were prepared with the same particle and lutidine concentration, which were named as composition A and composition B. In the composition A, the SLD of water was tuned to match that of particles, by mixing $H_2O$ and $D_2O$ with the volume ratio at 48:52, while the composition B was prepared with normal water ($H_2O$) as a reference. Their SANS results at different temperatures are shown in FIGS. 2A and 3B, respectively. In the liquid state (20° C.), both samples showed a peak at $q=0.016$ $\text{Å}^{-1}$ due to the inter-particle structure factor. However, in the gel state, the peak intensity for the composition A shows a sharp intensity drop by more than 5 times while that of composition B remains about the same as that in a liquid state. This difference of the relative change of the intensity in a gel state observed in FIGS. 2A and 3B was solely due to the solvent composition difference. For the composition A, the scattering intensity drops since the solvent surrounding particles is rich in matched water. And there is no contrast between the matched water and particle in a gel state, i.e., silica particles become almost invisible as schematically illustrated in FIG. 2C. In comparison, particles are visible in both liquid and gel states for the sample B prepared with normal water ($H_2O$), as schematically illustrated in FIG. 2D. These results thus indicate that the particles in the gel state are fully engulfed by the water rich solvent. The scattering peak does not completely disappear in FIG. 2A as the water rich solvent region still has small amount of lutidine as expected for a binary solvent system phase separation. The relative volume fraction in the water rich solvent region was estimated to be approximately 90% of water and 10% lutidine with a significant decrease of lutidine concentration from the nominal concentration of 30% volume fraction. (See Supplementary Note 1-3 for details.) The formed gel is thus indeed a SeedGel embodiment with particle and solvent partition schematically illustrated in FIG. 1B.

The formed gel was found to have excellent thermo-reversibility, precise structural reproducibility, stability, and tunability. The same samples in FIGS. 2A and 3B were measured twice by cycling the temperature between 20° C. and 30° C. The SANS scattering patterns together with the USANS results shown in Supplementary Note 1-4 were found to be completely identical at the same temperatures in gel states. Thus, both the local and large domain structure are not only thermally reversible, but also precisely reproducible when following the same heating protocol. In addition, the gel structure is very stable after at least 20 h of aging at 30° C. and no change of domain structures was observed by USANS within a reasonable duration of period. (Details are in Supplementary Note 1-5)

Thermo-Reversibility

Figure 4A:
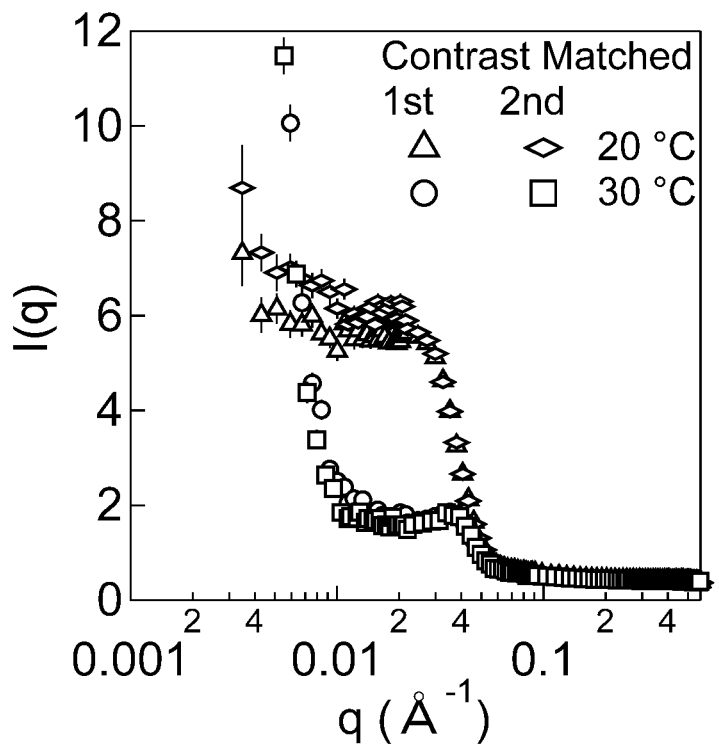
FIG. 4A: Thermo-reversible SeedGel embodiment prepared with 10 nm particles and different binary solvents probed by SANS and USANS. The SLD of water phase is matched to that of silica. The error bars represent one standard deviation and are often smaller than the symbol size.
Figure 4B:
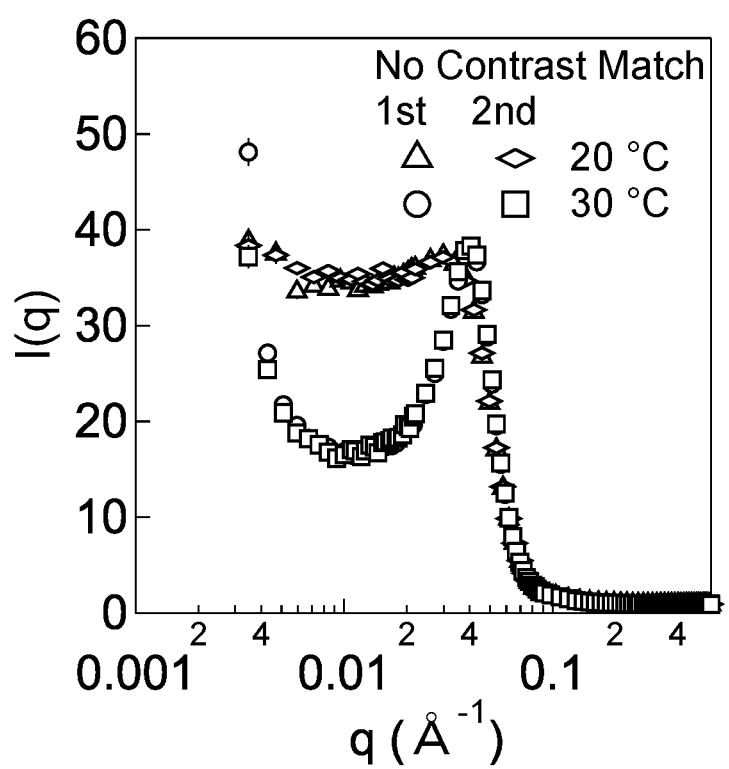
FIG. 4B: Thermo-reversible SeedGel embodiment prepared with 10 nm particles and different binary solvents probed by SANS and USANS. The SLD of water phase is not matched to that of silica. The error bars represent one standard deviation and are often smaller than the symbol size.

FIGS. 4A and 4B demonstrate feasibility, thermal reversibility, and structural reproducibility of SeedGel embodiment using spherical silica particles with 10 nm diameter by performing similar experiments shown in FIGS. 2A and 3B. Note that the $2^{nd}$ curve in FIG. 4A shows slightly higher intensity of low-q scattering when compared to that of the $1^{st}$ curve in the liquid state at 20° C. This change is due to the fact that a small amount of random sized aggregates that are not fully dissolved in the sample after the previous formation of SeedGel embodiment due to its slow kinetics. The fast advancement in nanoscience has successfully produced many interesting colloidal particles with size down to sub-10 nm in the past decades. One of the most successful examples is quantum dot with unique electrical and optical properties. SeedGel embodiment works very well with small size particles, opening up a window for many interesting colloidal particles with size down to 10 nm that are rather difficult to form Bijels.

Controlling Gelation Temperature by Tuning Binary Solvent System

The composition for the SeedGel embodiment has a broad range of adjustable gelation temperature as the gelation temperature can be tuned by controlling the property of the binary solvent system. Same silica particles (27 nm diameter) as used hereinabove were dispersed in two different binary solvent systems by replacing 2,6-lutidine with 2,5-lutidine and 2,4-lutidine. The SeedGel embodiment formation was observed with the corresponding gel transition temperature at 7° C. and 17° C., respectively due to the fact that changing solvent isomers shifted the bulk phase temperature of the corresponding binary solvent system. The sample prepared with 2,5-lutidine at the gel transition temperature (7° C.) was found to have lower scattering intensity due to the fact that the formed domain size was too large, outside of the q-range accessible by USANS. The tunability of gelation temperature greatly expands the applications of the composition for the SeedGel embodiment by designing its structure and property response to external stimuli at will. Any suitable binary solvent system as disclosed hereinabove may be used, depending upon particular application requiring particular gelation temperature or requiring transition to gelation upon cooling or heating.

Controlling Optical Properties of the SeedGel Embodiment

The optical properties of SeedGel embodiment can also be controlled by adjusting the refractive index between the particle domain and solvent domain. In the exemplary composition for the SeedGel embodiments, the refractive index of 2,6-lutidine (n=1.497) and silica (n=1.46) are both larger than that of water (n=1.33). Hence, when the temperature of the exemplary composition of the SeedGel embodiment is increased, the particle domain loses 2,6-lutidine while the solvent domain gains 2,6-lutidine because 2,6-lutidine is less soluble in water at higher temperatures. Consequently, the refractive index of the particle domain decreases and that of the solvent domain increases without the change of particle domain structures. At a certain temperature, the two domains are optically indistinguishable, but a domain size of a few micrometers still persists. The transparency to light provides opportunities for optically triggered reactions to occur within the bicontinuous channels that are difficult to be achieved by many other gel systems with micrometer sized domains. As a result, the SeedGel embodiment sample was found to be initially turbid at the gelation transition temperature of about 26° C., but it slowly became transparent at about 29° C.

This thermally reversible transparent SeedGel embodiment can also be obtained at various particle concentrations. In an embodiment, an exemplary composition for the SeedGel embodiment comprising water/2,6-lutidine as binary solvent system may comprise nanoparticles in an amount of such as 16.5%, 19.6%, and 21.7% by volume based on the total volume of the composition. This is due to the fact that the refractive index of the particle domain and the solvent domain is close to each other as a result of relative partition of lutidine in both domains. The finely adjustable optical property is thermo-reversibly driven by the solvent phase separation. Bijel samples and many other gel systems with micrometer sized domains are usually turbid. The formation of the transparent particle gel with micrometer sized bicontinuous domains introduces new opportunities for exemplary SeedGel embodiments to many light sensitive applications, such as sensors or transparent bicontinuous mold/micro-reactors for inducing photo-crosslinking of other materials.

In conclusion, SeedGel embodiment can be realized by tuning nanoparticle surface to be strongly favored by one component of a binary solvent system and no net attraction exists between particles in the liquid state. It shows excellent thermal reversibility, precise structural reproducibility, and tunable domain sizes at micrometer length scales. SeedGel embodiment is extremely versatile and is demonstrated here to work with different particle sizes and have a large range of adjustable gelation temperatures. One amazing property of the SeedGel embodiment is its tunability of the refractive index of different domains that is tough to achieve by physical gel systems with micrometer sized domains. As majority of colloidal particles are aqueous based, SeedGel embodiment provides an alternative route to achieve bicontinuous structures for many water-soluble particles that do not form Bijel. Thus, SeedGel embodiment complements Bijel systems and greatly extends the applications of bicontinuous structures formed by colloidal self-assembly. As the gel formation is initiated by the local binary solvent system phase separation, it is expected that this is a general approach that has potential to work with many different types of particles. Future works will be needed to evaluate its applications with other type of particles and binary solvent systems.

Supplementary Note 1-1: The Teubner-Strey Model for the Ultra-Small Angle Neutron Scattering (USANS) Fitting to Obtain the Domain Size Information Teubner-Strey model is widely used to fit the bicontinuous structure of a two-component system. The USANS scattering intensity was modeled using the correlation length ($\xi$) and periodicity (d). Their relationship is illustrated in Supplementary Equation 1 through Supplementary Equation 4.

$$I(q) = \frac{8\pi\varphi_a(1-\varphi_a)(\Delta\rho)^2 c_2/\xi}{a_2 + c_1 q^2 + c_2 q^4} \quad 1$$

$$a_2 = \left[1 + \left(\frac{2\pi\xi}{d}\right)^2\right]^2 \quad 2$$

$$c_1 = -2\xi^2\left(\frac{2\pi\xi}{d}\right)^2 + 2\xi^2 \quad 3$$

$$c_2 = \xi^4 \quad 4$$

where $\Delta\rho$ is the difference of scattering length density (SLD) and $\varphi_a$ is the volume fraction of one domain, which can be the volume fraction of either the particle domain or the solvent domain. The fitting was performed by fixing other parameters except the periodicity (d), correlation length ($\xi$), and scale. The reason to let scale vary is to account for the dynamic contrast change at varied temperatures between particle and solvent domains, which originates from the change of lutidine concentration in both water-rich and lutidine-rich solvent regions. The periodicity distance includes both the average size of the particle domain and solvent domain. If the ratio of the average domain size between the solvent and particle domain is approximately the volume ratio of these two domains, the average size of the particle domain is estimated to be about 2 µm, and the size of the solvent channel is about 1.3 µm at 30° C. At 26° C., the particle domain increases to 7.1 µm and the solvent channel to 4.5 µm.

SUPPLEMENTARY TABLE 1-1

The resulted periodicity and correlation length from Teubner-Strey model fitting of USANS data at different temperatures.

| Temperature (° C.) | Periodicity (µm) | Correlation Length (µm) |
|---|---|---|
| 30 | 3.34 | 1.80 |
| 29 | 3.38 | 1.73 |
| 28 | 3.37 | 1.75 |
| 27 | 3.52 | 1.80 |
| 26 | 11.6 | 3.66 |

Supplementary Note 1-2: Estimation of the Particle Volume Fraction in the Particle Domain with Small Angle Neutron Scattering (SANS) Fitting using the Hayter-Penfold Method In order to estimate the volume fraction of particles in the particle domain, SANS data at relatively high-q was fitted using the Hayter-Penfold model. Because the domain size is much larger than the particle diameter, most particles in the particle domain are not at the interface. As no additional salt is added into the solution and particles are highly charged, a strong long-range screened charge repulsion exists between particles. Therefore, in order to calculate the inter-particle structure factor with a long-range repulsion, the Hayter-Penfold model was used. Additionally, an attempt was made to fit the SANS pattern at high-q with other interaction models, such as pure hard sphere interaction, and the interaction with a short-range attraction and long-range repulsion. The charge interaction model was found to give the best fitting results.

To fit the SANS scattering results of concentrated particle solutions, an independent experiment was performed to obtain the information of the form factor: the radius of the sphere and the size polydispersity by fitting a scattering curve of a dilute particle dispersion in water (volume fraction of 0.5%).

In this model, the scale factor, volume fraction of spheres, as well as the charge on the sphere surface were used as fitting parameters. All the rest of the parameters were fixed at constant values. The scale factor was determined to be 0.697 and the local volume fraction to be 0.391.

Supplementary Note 1-3: Estimation of the Relative Concentration of Lutidine and Water in the Particle Domain The 2,6-lutidine ratio in the particle domain was estimated based on the results from contrast matching experiment shown in FIGS. 3A and 3B above. It should be noted that the intensity of the structure factor peak reduces by more than five times when changing from the liquid state to the gel state for this sample. This is due to the enrichment of water concentration in the particle domain. By using the SANS intensities of the inter-particle structure factor peak at different temperatures, the concentration of lutidine can be calculated with the Supplementary Equation 5 through Supplementary Equation 15.

$$\frac{I(A, 20°\ C.) - I_{bkg}}{I(A, 30°\ C.) - I_{bkg}} = \frac{(\Delta\rho(A, 20°\ C.))^2 P(20°\ C.) S(20°\ C.)}{(\Delta\rho(A, 30°\ C.))^2 P(30°\ C.) S(30°\ C.)} \qquad 5$$

$$\frac{I(B, 20°\ C.) - I_{bkg'}}{I(B, 30°\ C.) - I_{bkg'}} = \frac{(\Delta\rho(B, 20°\ C.))^2 P(20°\ C.) S(20°\ C.)}{(\Delta\rho(B, 30°\ C.))^2 P(30°\ C.) S(30°\ C.)} \qquad 6$$

$$\frac{\left(\frac{I(A, 20°\ C.) - I_{bkg}}{I(A, 30°\ C.) - I_{bkg}}\right)}{\left(\frac{I(B, 20°\ C.) - I_{bkg'}}{I(B, 30°\ C.) - I_{bkg'}}\right)} = \frac{(\Delta\rho(A, 20°\ C.))^2 (\Delta\rho(B, 30°\ C.))^2}{(\Delta\rho(A, 30°\ C.))^2 (\Delta\rho(B, 20°\ C.))^2} \qquad 7$$

$$\Delta\rho(A, 20°\ C.) = \qquad 8$$
$$SLD_{silica} - (\varphi_{A,Lutidine,t} SLD_{Lutidine} + \varphi_{matchedwater,t} SLD_{matchedwater})$$

$$\Delta\rho(A, 30°\ C.) = \qquad 9$$
$$SLD_{silica} - (\varphi_{A,Lutidine,d} SLD_{Lutidine} + \varphi_{matchedwater,d} SLD_{matchedwater})$$

$$\Delta\rho(B, 20°\ C.) = SLD_{silica} - (\varphi_{B,Lutidine,d} SLD_{Lutidine} + \varphi_{H_2O,t} SLD_{H_2O}) \qquad 10$$

$$\Delta\rho(B, 30°\ C.) = SLD_{silica} - (\varphi_{B,Lutidine,d} SLD_{Lutidine} + \varphi_{H_2O,d} SLD_{H_2O}) \qquad 11$$

$$\varphi_{A,Lutidine,t} = 1 - \varphi_{matchedwater,t} \qquad 12$$

$$\varphi_{A,Lutidine,d} = 1 - \varphi_{matchedwater,d} \qquad 13$$

$$\varphi_{B,Lutidine,t} = 1 - \varphi_{H_2O,t} \qquad 14$$

$$\varphi_{B,Lutidine,d} = 1 - \varphi_{H_2O,d} \qquad 15$$

where A and B denote samples with and without SLD of water matched to that of silica, as described in the main text. I(20° C.) and I(30° C.) are the peak intensity of SANS pattern at 20° C. and 30° C. $I_{bkg}$ and $I_{bkg'}$ are the intensity of the incoherent background for sample A and B, respectively. P is the intensity of the form factor at the peak position, and S is the value of the inter-particle structure factor at the peak position too. As the peak at 30° C. slightly shifts to high-q position compared to that at 20° C. and the packing of particles is different in the liquid state from that in the gel state, both the form factor and structure factor have different values at 20° C. and 30° C. Taking the ratio of sample A and B, shown in Eq-3, removes the change of both the form factor and the structure factor due to slight change of the q-position of the scattering peak at those two temperatures. $\Delta\rho$ is the SLD difference between silica particles and its surrounding solvent in each temperature. $\varphi_{Lutidine,t}$ and $\varphi_{matchedwater,t}$ are the volume fractions of lutidine and water in the total sample volume, respectively. $\varphi_{Lutidine,t}$ and $\varphi_{matchedwater,t}$ are the volume fraction of lutidine and water in the particle domain, respectively. The intensity of the peaks was known from experiment and SLD was calculated based on chemical formula and density. The volume fraction of lutidine and water was determined to be 10.4% and 89.6% in the particle domain.

Supplementary Note 1-4: USANS Patterns of a Sample to Demonstrate the Thermal Reproducibility, the Long-Time Stability, and Domain Size Tunability Two USANS patterns at 30° C. were measured after cycling the temperature through 4° C. The USANS patterns were found to be completely identical, indicating that the domain structures are precisely reproducible when quenching rate is the same. Additionally, the USANS patterns of the exemplary composition in the gel state (at a fixed temperature of 30° C.) as a function of time were measured. The USANS data did not show any change for the exemplary composition in the gel state at a constant temperature for at least 20 hours, demonstrating that the domain structure is stable for at least 20 hours without aging effect.

Overall, SeedGel embodiment which is the gel state of the composition is thermally reversible with great structural reproducibility and stability.

Figure 3D:
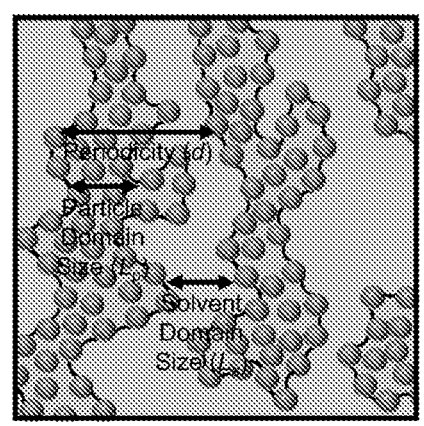
FIG. 3D: A schematic illustration of the case of SLD of water not matched to that of silica as in Composition B, corresponding to FIG. 3B.

Experiment No. 2: Controlling Domain Size and Size Distribution of Bicontinuous Structures of the Seedgel Embodiment As disclosed hereinabove, in order to prepare a SeedGel embodiment, nanoparticles need to be dispersed in a binary solvent system in its single-phase region. The exemplary composition disclosed hereinabove was tested for SeedGel embodiment formation at about 27.4° C. The formed gel had strong mechanical strength that allowed a flip-vial test, where the gel retained its form when the vial was flipped upside down. Rhodamine B was used as a dye that is known to favorably partition to the 2,6-lutidine rich solvent domain so that a picture of the bicontinuous structure could be taken by a confocal microscope. Those bicontinuous micrometer domains were clearly visible under a confocal microscope. FIG. 3D schematically illustrates the structure of SeedGel embodiment with alternating particle domains and solvent domains. One important parameter to characterize the domain structure is the average distance between neighboring particle domains, or the periodicity (d). The periodicity can be also considered as the summation of the average channel widths of both the particle (Lp) and solvent domains (Ls). Those dimensions will be discussed in later sections. It is important to note that the domain size is widely used in Bijel to describe the channel width of bicontinuous structures. The term "domain size" is used here to describe the channel width of SeedGel embodiment.

Controlling Domain Size by Nanoparticle Concentration

As nanoparticle concentration and solvent composition are both important for the SeedGel embodiment formation, it is crucial to obtain a complete and quantitative picture of their effects on the domain size structure of the bicontinuous system. As disclosed hereinabove, the periodicity of a SeedGel embodiment is in the range of a few micrometers. Thus, ultra-small angle neutron scattering (USANS) is an ideal tool that provides quantitative structure characterization in the right length scale. Consequently, a series of four different compositions for SeedGel embodiment comprising nanoparticle concentrations of 16.5%, 17.9%, 19.6%, and 21.7% by volume, based on the total volume of the composition, were prepared at a fixed 2,6-lutidine weight fraction and their corresponding gel structures were investigated with USANS. All four compositions were in the liquid state at room temperature and became SeedGel embodiments at 30° C. The USANS scattering patterns (not shown) of these four compositions at 30° C. showed that at intermediate particle volume fraction of 17.9%, the formed SeedGel embodiment showed a relatively well-defined peak with a very flat low-q scattering curve. This is a typical scattering pattern for a bicontinuous structure. The flat curves at low-q with a well-defined scattering peak indicate a relatively well-defined repeating distance of bicontinuous structures. By slightly increasing particle volume fraction from 17.9% to 19.6%, the peak position was shifted to a higher q-value, which means that the inter-domain distance in these SeedGel embodiment samples became smaller. Thus, within a certain range, increasing the nanoparticle concentration decreases the periodicity. Teubner-Strey model was used to fit the experimental data to obtain the periodicity of the bicontinuous structures. The detailed description of the model and the fitting results can be found in the Supporting Note 2-1 and Table S2-1. The periodicity of the domains was found to decrease from 12.6 μm to 2.68 μm by simply increasing the particle volume fraction by 1.7%. At this concentration range, the q-dependence in the high-q range follows $$\frac{1}{q^3}.$$

Note that the USANS has a slit smearing function that affects the q-dependence. After desmearing, the true q-dependence follows Porod's law, i.e., $$\frac{1}{q^4}.$$

This indicates that the interface between the particle domain and solvent domain is relatively sharp and smooth.

Further reducing the nanoparticle volume concentration to 16.5% disturbed the repeatability of the domain size. A hump was observed between $2\times10^{-4}$ Å$^{-1}$ and $3\times10^{-4}$ Å$^{-1}$, while the low-q scattering intensity kept increasing without a flat region at low-q. This suggests that a larger domain size starts to develop. And the periodicity has a much broader distribution for the sample at 16.5% particle volume fraction. Hence, the domain size has a much wider range of distribution (Table S2-2 in the Supporting Note 2-1 for detailed discussion). By increasing the particle concentration to 21.7%, the domain size distribution also becomes larger. Therefore, at a constant 2,6-lutidine ratio, the particle concentration needs to be carefully adjusted to achieve the desired structures. For some applications, the well-defined channel (domain) size, as manifested as a better-defined periodicity, may be desirable. However, for other applications, the random distribution of the channel size could be preferred. Here, the interest is in identifying the conditions to optimize the SeedGel embodiment with a well-defined domain size. Consequently, the 'optimal' sample condition is at an intermediate range of particle concentrations. Too large or too small of the particle concentration would broaden the distribution of the domain sizes. Within the 'optimal' range of sample conditions with ordered repeating distance, a higher volume fraction is found to reduce the periodicity of the domains.

Controlling Domain Size by Binary Solvent Composition

Besides the particle concentration, the 2,6-lutidine weight fraction is another important parameter that can be used to tune bicontinuous structures. USANS measurements were performed on SeedGel embodiment of the exemplary compositions prepared with different 2,6-lutidine concentrations at 30° C. while fixing the particle to water ratio at a constant value. Notably, the particle concentration used here corresponds to a volume fraction of 13.7%, which is much smaller than the concentration (about 24%) used in an exemplary composition disclosed hereinabove in the Example 1 with a lower 2,6-lutidine ratio.

Similar to what was observed by varying the particle concentrations, it was found that an optimum solvent composition (weight fraction of 37.2% in the exemplary binary solvent system) is important in realizing bicontinuous structures with well-defined repeating distance. This is evidenced by an obvious hump in the USANS scattering profile with a flat low-q scattering intensity (not shown). By fitting the results with the Teubner-Strey model, a periodicity of 2.65 μm was obtained (Table S2-1 in the Supporting Information). Compared to the scattering profile at 'optimal' 2,6-lutidine weight fraction of 37.2%, a higher or lower solvent ratio led to an increase in scattering intensity at the low-q range, which extended outside the USANS window. This suggests that for a fixed particle concentration, there exists an 'optimal' solvent composition to obtain a well-defined repeating distance. A deviation from the 'optimal' solvent composition increases the randomness of the domain size distributions with a substantial increase of the fraction of large domains.

Additionally, the resulting SeedGel embodiment of the compositions with varying amounts of 2,6-lutidine were characterized by small angle neutron scattering (SANS). It was observed that a higher 2,6-lutidine ratio greatly increases the scattering intensity at low-q (q<0.01 Å$^{-1}$), which is consistent with the USANS experiments that solvent composition could considerably affect the domain structure. It is interesting to note that although the large micro-domain structure was found to be sensitively affected, the local packing of the particles as indicated by the interparticle distance peak remained almost unchanged. This suggests that the local particle packing in the particle domain is not affected in the gel state. Within the particle domain, the particles are uniformly and closely packed with an estimated volume fraction of around 40%. There are still some slight differences in the structure factor peak of the SANS data. At relatively low 2,6-lutidine ratios (25.8% and 28.8%), the peaks were identically sharp and located at about 0.023 $Å^{-1}$. By significantly increasing the 2,6-lutidine concentration (weight fraction of 31.4%) to the limit at this particle concentration, the interparticle distance peak became slightly broader and its position shifted to about 0.022 $Å^{-1}$. This indicates that the local particle concentration is slightly reduced and the interparticle spacing becomes a little larger.

Thus, both the 2,6-lutidine ratio and silica particle concentration need to be adjusted in order to form bicontinuous structures with the domains having a well-defined repeating distance.

With detailed discussions on how the concentration of each component affects both the periodicity of the microdomain and local nanoparticle packing distance within the particle domain, it is useful to summarize the compositions compatible with SeedGel embodiment formation in a ternary phase diagram. It could be used as a design guideline to engineer the domain structures and benefit future SeedGel embodiment preparations. In the ternary phase diagram shown in FIG. 5, all concentrations were converted to weight fractions over the total mass of the exemplary composition. The region that leads to thermo-reversible SeedGel embodiment is schematically shaded in grey. Whether a gel is formed or not was judged by a vial flipping test. The solid line indicates the 'optimal' conditions that would result in bicontinuous structures with well-defined inter-domain spacing. A quantitative analysis of the bicontinuous structures with USANS suggests that the compositions along the green line result in similar averaged periodicity of about 3 μm (2.62 μm, 2.68 μm, 2.65 μm, 2.68 μm, and 2.97 μm). Along the solid line, the particle volume fraction could be reduced to 9.8% by properly increasing the 2,6-lutidine ratio (Table S2-1 in the Supporting Information). As discussed already, a wide distribution of the domain size is formed in the gel state in the grey region outside the 'optimal' conditions. As a rule of thumb, an increase in particle concentration would require a decrease in the 2,6-lutidine ratio for SeedGel embodiment formation.

If the concentrations of both silica particles and 2,6-lutidine are too high in a sample (i.e. moving upper right away from the grey region in the phase diagram), increasing the temperature does not cause gelation. Instead, silica particles usually precipitate even at low temperatures because the kinetics of the aggregation formation is so fast that the precipitation occurs before the percolation.

Without wishing to be bound by any particular theory, it is believed that using colloidal particles with the density closer to the binary solvent system, the area of the SeedGel embodiment formation in the phase diagram could potentially be extended to a much larger region than what is identified in the exemplary composition. On the other hand, by reducing the concentrations of particles and 2,6-lutidine simultaneously (i.e. moving bottom left away from the grey region in the phase diagram), a liquid state sample can be formed at room temperature, but do not percolate to form a gel at elevated temperatures. This is most likely because not enough aggregates are formed to percolate throughout the sample upon heating as a result of low particle and 2,6-lutidine concentrations.

Controlling Domain Size by Temperature Ramping Rate

In an embodiment of the composition, the size of each of the particle micro-domain and the solvent micro-domain is dependent upon a temperature ramping rate of the thermo-reversible transition of the composition from the liquid state to the gel state. In an embodiment, the temperature ramping comprises heating the composition from a lower initial temperature (liquid state) to a higher temperature (gel state). In another embodiment, the temperature ramping comprises cooling the composition from a higher temperature (liquid state) to a lower temperature (gel state). In particular, the domain size of a SeedGel embodiment of the composition disclosed herein can be manipulated by controlling the temperature ramping rate. USANS profiles of the above SeedGel embodiment (the particle volume fraction over the total sample volume was about 24% and the 2,6-lutidine mass fraction in the binary solvent system was 28.4%) at four different ramping rates(0.1, 0.5, 1, and 2° C./min) were compared and domain sizes were determined by fitting USANS data with the Teubner-Strey model, summarized below. The domain size was found to be dynamically adjusted. It was found that faster ramping rate leads to a smaller domain size, whereas a slower quenching results in a larger domain size.

|  | Temperature Ramping Rate | | | |
| --- | --- | --- | --- | --- |
|  | 0.1° C./min | 0.5° C./min | 1° C./min | 2° C./min |
| Particle domain size (μm) | 3.72 | 2.45 | 2.02 | 1.61 |
| Solvent domain size (μm) | 2.34 | 1.55 | 1.27 | 1.01 |

In particular, Experiments were designed to heat a sample from 20° C. (liquid state) to a final temperature of 30° C. (gel state) to form a SeedGel embodiment with four different temperature ramping rates. It was found that the peak position shifted from approximately $8 \times 10^{-5}$ $Å^{-1}$ to $2 \times 10^{-4}$ $Å^{-1}$ by changing the ramping rate from 0.1° C./min to 2° C./min. The ramping rate used here is the actual quenching speed that was measured within the sample. A careful calibration was performed by correlating the control temperature ramping rate to the actual temperature change speed using a temperature sensor placed inside a SANS cell. The measured temperature inside the SANS cell was plotted as a function of time and a straight line was observed for slow ramping rates: 0.1° C./min and 0.5° C./min. As discussed in Example 1, the gelation temperature for a SeedGel embodiment sample with an identical concentration is at about 26° C. The temperature ramping rate matters the most around the gelation temperature to determine the domain structure. This is suggested from the fact that no structural change was observed at temperatures higher than 26° C. Also, the domain structure right at 26° C. deviated from those formed at temperatures above the gelation point. Thus, the ramping rate crossing 26° C. is considered as the actual rate that determines the gel structure of a SeedGel embodiment. For the slow settings (0.1° C./min, 0.5° C./min, and 1° C./min), the measured curves were linear in this region and the calibrated ramping rates of the sample were close to the ramping rate of the control temperature. At higher ramping rates for the control temperatures, the temperature increase started to slow down when getting close to the set temperature. Due to the control loop mechanism employed by typical PID controllers, the closer to the setpoint, the more reduction of the ramping rate. This was found to be especially true in the fastest ramping rate of 10° C./min. To accurately determine the heating speed for the set value of 10° C./min, the range between 24° C. and 26° C. was used for linear fitting. Table S2-3 in the Supporting Information summarizes the calibrated ramping rates corresponding to each set value. The obtained periodicity by Teubner-Strey model fitting (was plotted as a function of calibrated ramping rate (r). It was found that the fast ramping rates could effectively reduce the domain size. Ramping rates were shown to have a clear linear dependence of the periodicity on the ramping rate in a semi-log scale. Furthermore, the experimental data was fitted to obtain an empirical relationship between domain size and the ramping rate. This empirical relationship can be useful for designing the desired domain size by controlling the temperature ramping rate. The periodicity dependence on the ramping rate is attributed to the kinetical competition between percolation and nucleation growth. At fast ramping rates, small aggregates are formed from local phase separation near particles and used to form percolation with narrower channels.

Figure 5:
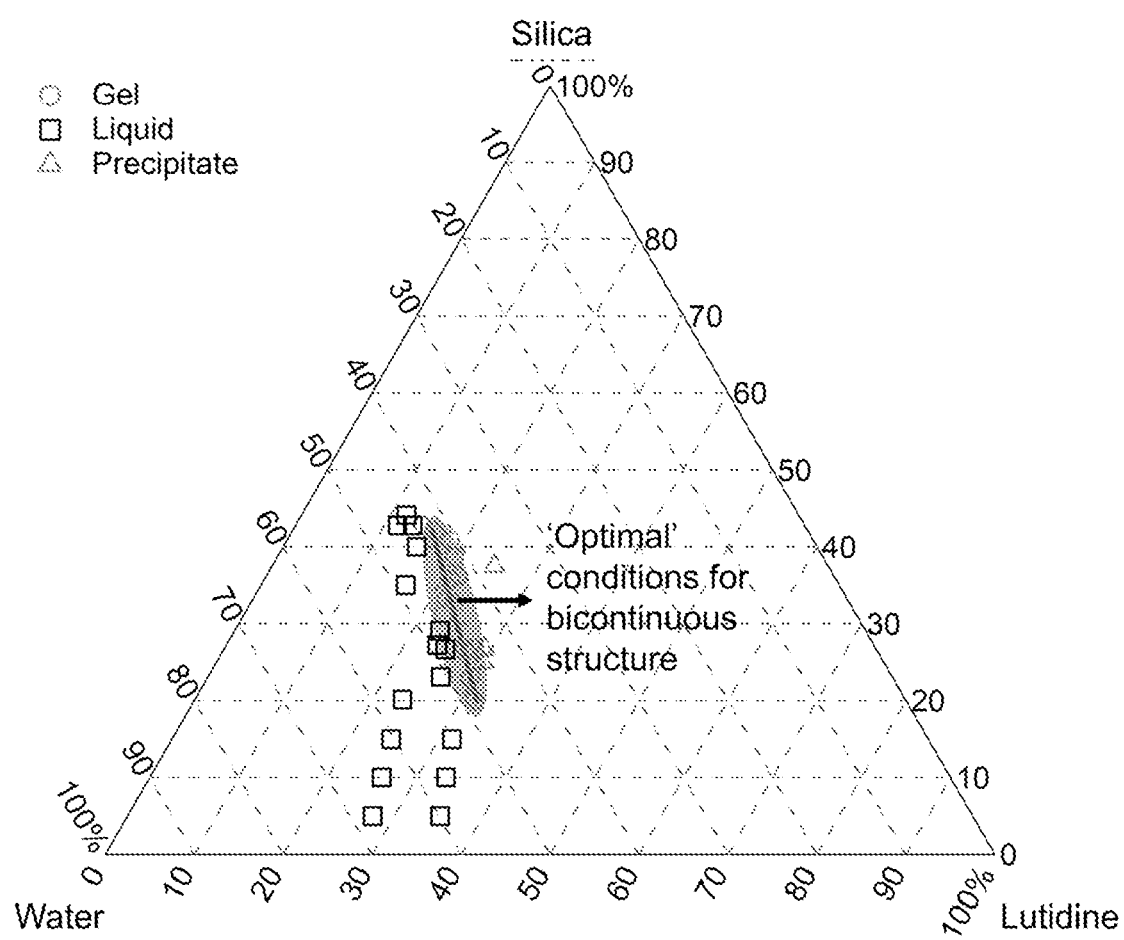
FIG. 5: A schematic illustration of a phase diagram of an exemplary SeedGel embodiment. The compositions of all components in the system are weight fractions over the total mass. The circular open symbols represent conditions that can result in thermo-reversible SeedGel embodiment. The square open symbols indicate regions that are in the liquid state at room temperature but do not gel when heated up. The triangular open symbols are concentrations that precipitate at room temperature. The shaded area illustrates compositions that lead to the formation of SeedGel embodiment. The solid line indicates the 'optimal' conditions for obtaining bicontinuous structures with well-defined repeating distance.

It is important to point out that the change of the ramping rate does not affect the distribution of the periodicity of domain structures determined before. Hence, the optimal sample composition identified in the schematic phase diagram shown in FIG. 5 is not expected to be affected by the ramping rate. However, the exact domain size for these samples may be further affected by the ramping rate.

Thus, for a SeedGel embodiment, controlling the ramping rate is a simple and effective way to change the size of the bicontinuous channels due to its thermo-reversibility and stability.

Quasi-Static Heating

The structure of the exemplary composition for the Seed-Gel embodiment was tested by increasing the temperature from liquid to its gel state. SANS profiles were recorded at each temperature upon heating. Considering the time for the measurement, ramping and equilibration, it took about an hour at every temperature point. It was found that gels can be successfully formed even with a very slow ramping rate (0.1° C./min) as discussed hereinabove. This is in sharp contrast to the fast quenching rate required in many Bijel systems. The quasi-static temperature change relaxes the restriction in sample size and makes the gel formation easily scalable to a large sample volume. At the same time, the ability to generate SeedGel embodiment even at very slow ramping rate provides an additional knob to control the domain size.

Similar to FIG. 2B, the charge repulsion dominates the interactions between silica particles at 20° C. A well-defined peak at high-q (approximately 0.023 Å$^{-1}$) is due to the correlation between nearest neighbor particles with a strong charge repulsion. Right below gelation transition temperature (24° C.), a broad peak at q-values between 0.001 Å$^{-1}$ and 0.01 Å$^{-1}$ is observed. This indicates that the attraction introduced by solvent fluctuation between particles is reasonably strong to cause the particle aggregation. Further increasing the temperature leads to the SeedGel embodiment formation with particle domains percolating throughout the whole sample volume. This is indicated by the Porod's law behavior with a q$^{-4}$ decay at the low-q range.

Additionally, the USANS experiments during gradual cooling of SeedGel embodiment showed that the domain size remains the same at temperatures about one degree higher than the gelation point, but it slowly changes when the final temperature is very close to the gelation temperature. To clearly understand this structure change at the transition point, controlled experiments were conducted. In particular, USANS data of SeedGel embodiment formed with a final temperature close to the gelation temperature (about 26° C.) was compared to that produced with a much higher final temperature (30° C.). A slow ramping rate (0.1° C./min) was used to avoid the decrease of the ramping rate close to the final temperature due to the PID control loop since the gelation temperature (26° C.) was set as the final temperature in this experiment. The sample was fully regenerated by dissolving the gel structure at 20° C. before quenching to different final temperatures to eliminate the process history. All the smeared USANS results showed a slope of −3, meaning that a smooth interface between the two domains was observed. It was found that the peak shifts to a lower q-value around the transition point (26° C.), suggesting that a final setting temperature close to the gelation point could increase the size of the bicontinuous channels. The periodicities obtained with the Teubner-Strey model fitting were consistent with the trend observed before, the size increases from approximately 6 μm (30° C.) to 8 μm (26° C.) by quenching the sample right to gelation temperature. Hence, the final quenching temperature close to the gelation point could be applied to a composition if a larger domain size is preferred. Also, the exemplary composition showed excellent reproducibility at both temperatures, as indicated by the spot-on USANS profiles for repeated measurements at the same condition (not shown).

In conclusion, one can control the domain size and the size distribution of bicontinuous structures through particle concentration, solvent composition, temperature ramping protocol, and final temperature for the SeedGel embodiment preparation. Combined USANS and SANS analysis provide a quantitative description of the structure over a wide range of length scales. 'Optimal' concentrations are identified for both particle and 2,6-lutidine concentrations to realize well-repeating bicontinuous domains in a SeedGel embodiment. Within the 'optimal' range, a higher particle concentration leads to a decrease of periodicity. Higher or lower concentrations outside the 'optimal' range induce a wider distribution of the domain sizes. A schematic phase diagram is thus provided that can benefit the production of SeedGel embodiment. Interestingly, although particle concentration and 2,6-lutidine ratio can effectively tune the domain structure, a similar densely packed local particle structure is observed for SeedGel embodiments with different compositions. Ramping rate is another effective way to control the size of the bicontinuous structure. An empirical linear relationship is extrapolated between the domain size and the logarithm of the ramping rate. Slow ramping rates would lead to the formation of large periodicity. Large domain structure can also be reproducibly formed with a final temperature close to the gelation temperature.

Supplementary Note 2-1: Description of the Teubner-Strey Model and Summary of Fitting Results Bicontinuous structures have been widely described with the Teubner-Strey model. This model has been previously implemented to successfully fit the micro-domains of Seed-Gel embodiment. A detailed description of the model and how the domain size is obtained is explained herein above in Supplementary Note 1-1. In brief, correlation length ($\xi$) and periodicity (d) are used to model the scattering profile. The mathematic expressions are listed from Equation 16 to Equation 19 as follows.

$$I(q) = \frac{8\pi\varphi_a(1-\varphi_a)(\Delta\rho)^2 c_2/\xi}{a_2 + c_1 q^2 + c_2 q^4} \quad 16$$

$$c_1 = -2\xi^2\left(\frac{2\pi\xi}{d}\right)^2 + 2\xi^2 \quad 17$$

$$c_2 = \xi^4 \quad 18$$

$$a_2 = \left[1 + \left(\frac{2\pi\xi}{d}\right)^2\right]^2 \quad 19$$

Where $\varphi_a$ represents volume fraction of one of the domains, $\Delta\rho$ is the contrast term that is equal to the scattering length density (SLD) difference between the two domains. Three parameters (i.e. periodicity (d), correlation length ($\xi$), and scale) are left as variables with the rest terms fixed as constant values during the model fitting. The obtained sizes are listed in Table S2-1 and the fitting results demonstrates that the q-dependence of the scattering curve follows Porod's law, i.e. $\frac{1}{q^4}$, after desmearing.

To show the wide channel size distribution of the scattering curves with the low-q upturn, two sample compositions are chosen as examples to fit with a model of combining two Teubner-Strey models together. The fitting results of this model indicate that one domain size is not enough to explain our scattering data. And there should be a wider distribution of the domain size. The upturn of the very low-q intensity is due to the emergence of larger domains in addition to the smaller domains (averaged close to 3 µm). The relative volume fraction ratios of the domains are obtained and shown in Table S2-2 based on the assumptions that both the particle volume fraction and solvent compositions in particle domains remain the same everywhere. It is noted that even though the fitting agrees with the experimental results very well, the fitting results are biased by the proposed model. It could be possible that the distribution of the domain size may have more than two dominating values. However, this requires introducing more fitting parameters to fit the data. The current proposed model has the minimum number of parameters needed to fit the data. And its fitting results already support the conclusion that the domain size has a larger distribution than those SeedGel embodiments at the optimal conditions.

By increasing the 2,6-lutidine ratio along the 'optimal' condition suggested in the phase diagram in FIG. 5, the particle volume fraction can be further reduced to 9.8%. Similar to what is observed before, the 'optimal' conditions result in periodicities of about 3 µm (Table S2-1).

TABLE S2-1

USANS fitting results of periodicity and correlation length from Teubner-Strey model for samples prepared with different particle concentrations and varied 2,6-lutidine compositions in a binary solvent system.

| Particle Volume Fraction (%) | 2,6-lutidine Weight Fraction (%) | Periodicity (µm) | Correlation Length (µm) |
|---|---|---|---|
| 19.6 | 32.4 | 2.68 | 0.55 |
| 17.9 | 32.4 | 12.6 | 2.58 |

TABLE S2-1-continued

USANS fitting results of periodicity and correlation length from Teubner-Strey model for samples prepared with different particle concentrations and varied 2,6-lutidine compositions in a binary solvent system.

| Particle Volume Fraction (%) | 2,6-lutidine Weight Fraction (%) | Periodicity (µm) | Correlation Length (µm) |
|---|---|---|---|
| 13.7 | 37.2 | 2.65 | 0.52 |
| 11.5 | 38.5 | 2.68 | 0.49 |
| 9.8 | 39.6 | 2.97 | 0.53 |

It should be noted from Table S22-1, that it is possible to adjust the periodicity by changing the particle concentration. For example, by lowering the particle concentration from 19.6% to 17.9%, while keeping everything else the same, periodicity changed from 2.68 µm to 12.6 µm.

TABLE S2-2

Domain sizes and fractions extrapolated from the combined model fitting. Sample A has a 2,6-lutidine mass fraction of 32.4% and a particle volume ratio of 16.5%. Sample B has a 2,6-lutidine mass fraction of 35.7% and a particle volume ratio of 13.7%.

| | Large domain | Small domain | The larger domain volume fraction |
|---|---|---|---|
| Sample A | 40.0 µm | 2.62 µm | 78.7% |
| Sample B | 58.2 µm | 2.99 µm | 30.6% |

Supplementary Note 2-2: Temperature Calibration of MUZSAC Sample Environment

MUZSAC is a 6-position sample changer developed at NCNR for both SANS and USANS experiments. It allows the independent temperature control for individual samples with precise and rapid temperature ramping rates. Due to the large heat capacity of the SANS cell because of a large volume, the actual ramping rate, especially at fast quenching, deviates from that with slow heating. In order to calibrate the actual ramping rate inside the SANS cells at the sample position, an additional experiment was performed to measure the temperature change inside the SANS cell using a temperature sensor that is placed inside the cell. The temperature change as a function of time for four different setting rates: 0.1° C./min, 0.5° C./min, 1° C./min, and 10° C./min were recorded, Linear fits are used within the temperature range that is of interest to determine the actual ramping rates. For fast ramping rates, a dramatic decrease of the ramping rates is observed when the temperature gets close to the set temperature because of the PID loop control. This affects the fastest setting rate of 10° C./min the most. In order to obtain the accurate ramping rate, the region that is close to the gelation temperature of SeedGel embodiment (around 26° C.) was used to extrapolate the actual ramping rate for the sample. The calibrated results are summarized in Table S2-3 below for each of the setting ramping rates.

TABLE S2-3

The averaged ramping rates and standard deviations of five calibrations measured from the actual temperature inside the SANS cells.

| Set Ramping Rates (° C./min) | Calibrated Ramping Rates (° C./min) | Standard Deviations of Calibrated Ramping Rates (° C./min) |
| --- | --- | --- |
| 0.1 | 0.0980 | 0.00303 |
| 0.5 | 0.483 | 0.0139 |
| 1 | 0.936 | 0.0319 |
| 10 | 1.89 | 0.296 |

Supplementary Note 2-3: Effect of Quenching Depth on SeedGel Embodiment Formation Different from Bijel, too large of a quenching depth into the spinodal decomposition region would lead to macroscopic phase separation of SeedGel embodiment, as observed in a Composition for SeedGel embodiment, where the composition phase-separated after heating to 40° C. for 2 h. A relatively clear liquid layer appeared on top, and a cloudy, and more viscous, liquid layer stayed at the bottom. The mechanical strength was reduced, and the sample could not withstand the yield stress implemented by vial flipping, as both liquid layers flowed to the bottom under gravity. In comparison, as disclosed hereinabove, SeedGel embodiment with the same composition could remain unchanged for at least 20 h at a lower temperature of 30° C., a temperature that is under the critical point of the bulk solvent with the same composition.

Figures 6A, 6B:
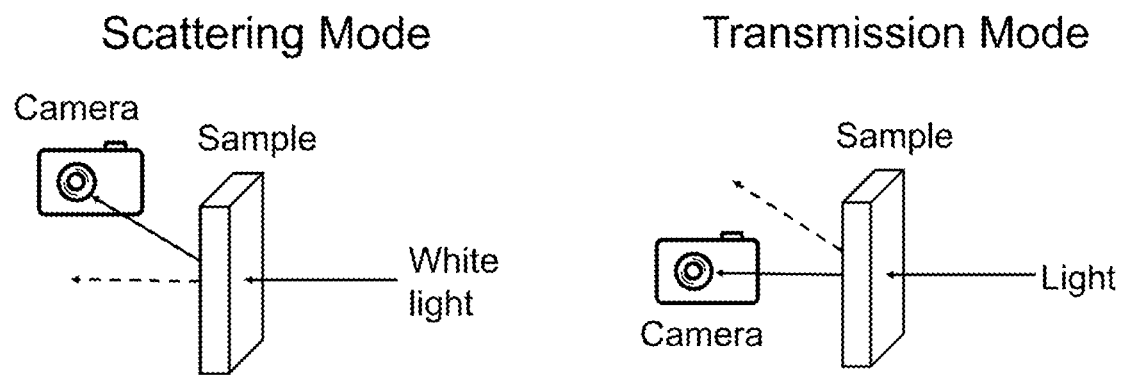
FIG. 6A: Schematic drawing illustrating the experimental setup in scattering mode.
FIG. 6B: Schematic drawing illustrating the experimental setup in transmission mode.

Experiment No. 3: Tunable Optical Properties of a Thermo-Reversible Bicontinuous Nanoparticle Seedgel As discussed hereinabove, compositions comprising nanoparticles dispersed in a binary solvent system can be thermo-reversibly assemble into bicontinuous structures through solvent segregation driven gel (SeedGel embodiment) in a scalable, reproducible, and tunable manner. It is interesting that dynamically tunable coloration can be realized within the SeedGel embodiment framework, even with micrometer domains. The experimental setup of scattering mode and transmission mode are illustrated in FIGS. 6A and 6B respectively. White light can be selectively scattered from a SeedGel embodiment of the present composition to produce color, controlled by temperature, as shown in FIG. 6A. The SeedGel embodiment of the exemplary composition appearedd blue (short wavelength) at relatively high temperatures and gradually transits to yellow (long wavelength) when cooled down. Interestingly, the colored SeedGel embodiment of the exemplary composition disclosed hereinabove appeared transparent at the same time, evidenced by a visible back side of the sample holder. Too high (above 29.7° C.) or too low (below 26.9° C.) of the temperature increases its opacity. On the other hand, the wavelength of transmitted light is in complement to that of scattered light, as shown by FIG. 6A, which suggests physical light-matter interactions. Red light (long wavelength) is allowed to pass through the gel at high temperatures, but only blue light (short wavelength) is permitted at lower temperatures. A temperature below the gelation point (26° C.) reverts the SeedGel embodiment of the exemplary composition back to the liquid state (20° C.), making it transparent to all visible light. This was further confirmed by a broadband transmission (not shown). Therefore, the coloration is not a result of absorption or luminescence of the chemical species (silica, water, 2,6-lutidine) in the SeedGel embodiment of the composition. Rather, it is the structures formed within the composition that is responsible for this modulated wavelength control.

Temperature-Dependent Wavelength Modulation

In an embodiment, each of the particle micro-domain and the solvent micro-domain have a different refractive index dependence on wavelength, and wherein the refractive index of the particle micro-domain matches with that of the solvent micro-domain for an identified wavelength at an identified temperature, whereby the composition becomes transparent to the identified wavelength at the identified temperature.

In another embodiment, the composition in the gel state has tunable wavelength-dependent properties for a range of wavelengths as a function of temperature, wherein the wavelength-dependent properties comprise one or more of: scattering and transmittance. The wavelength can be in the range of 200 nm to 2400 nm.

Figure 6C:
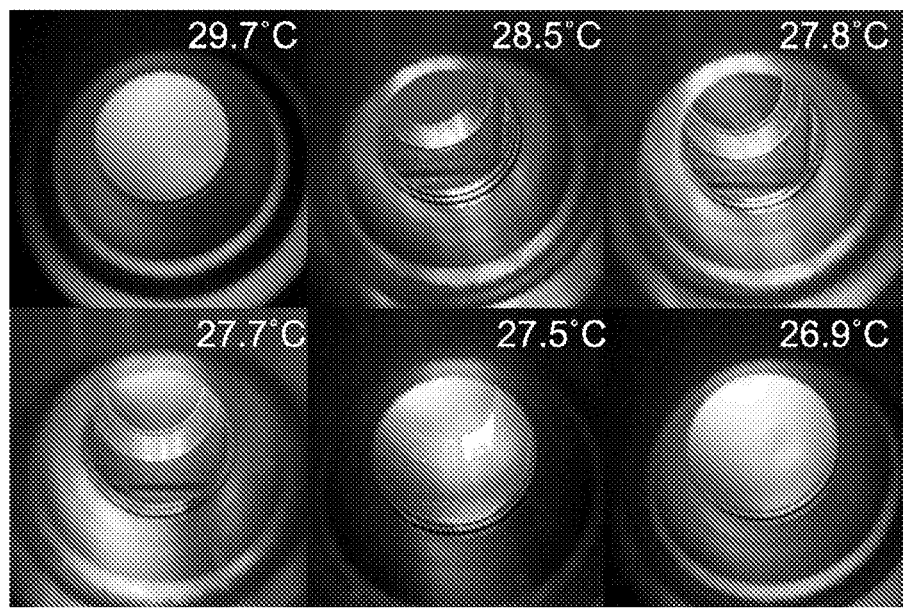
FIG. 6C: Photographs of SeedGel embodiment with tunable structural color recorded in scattering mode at different temperatures. White light source is used.
Figure 6D:
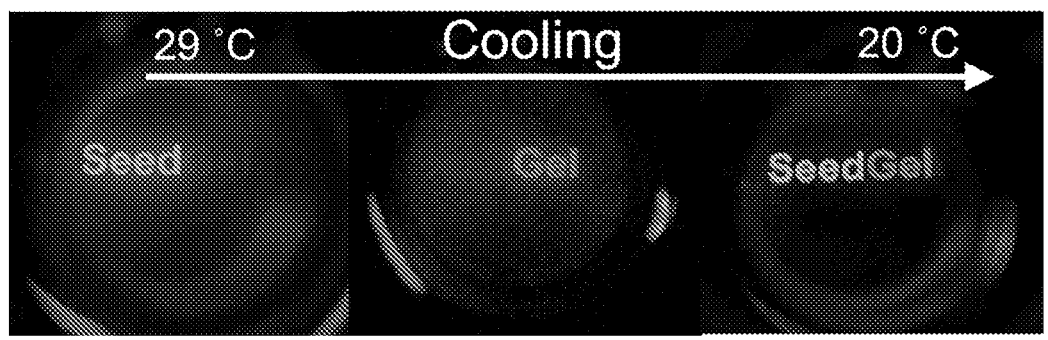
FIG. 6D: Photographs of SeedGel embodiment with temperature-dependent wavelength filtering in transmission mode during cooling. The colored word "SeedGel embodiment" displayed by an OLED screen
Figure 7:
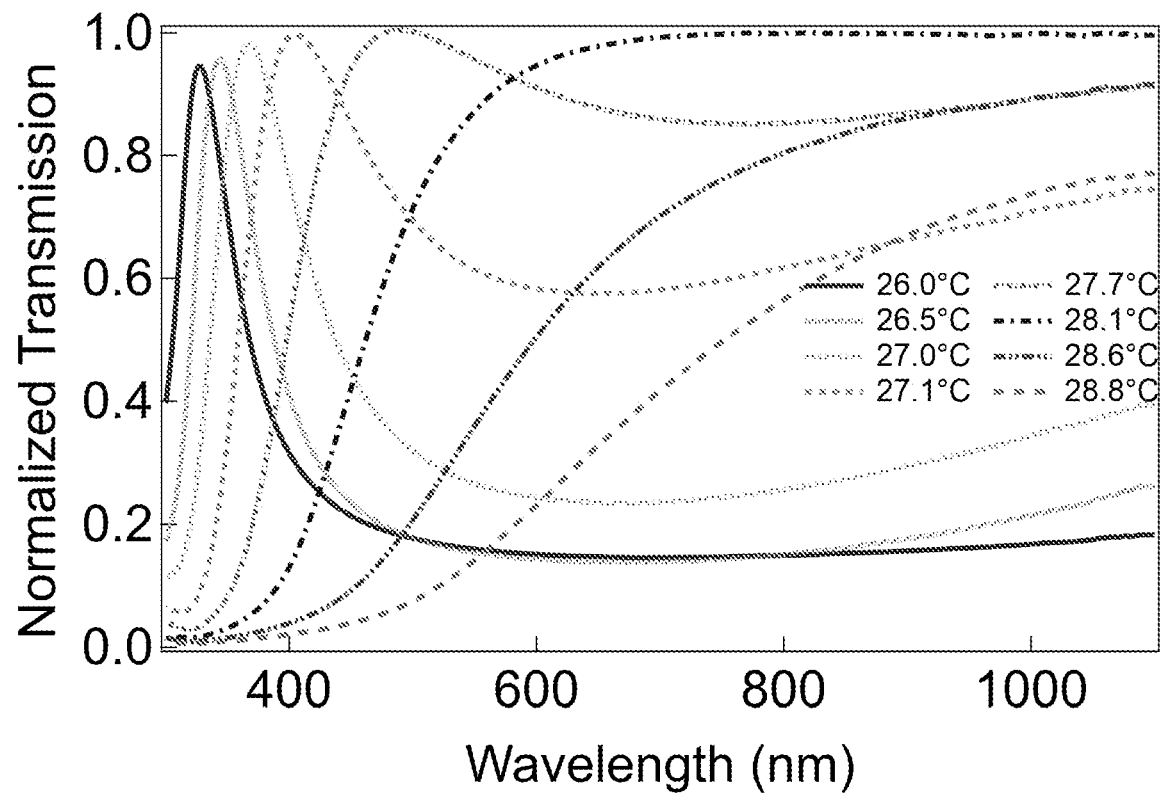
FIG. 7: Normalized transmission spectra of SeedGel embodiment as a function of wavelength at varied temperatures. By increasing the temperature, the transmission peak shifts towards longer wavelength.
Figure 8:
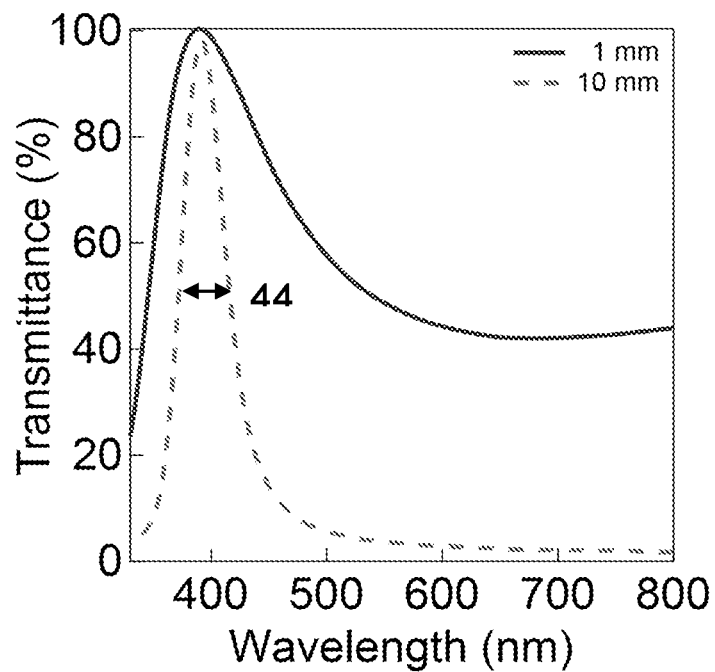
FIG. 8: The effect of path length on the peak width of the transmitted light of SeedGel embodiment with both calculation and experimental data are shown.
Figure 9:
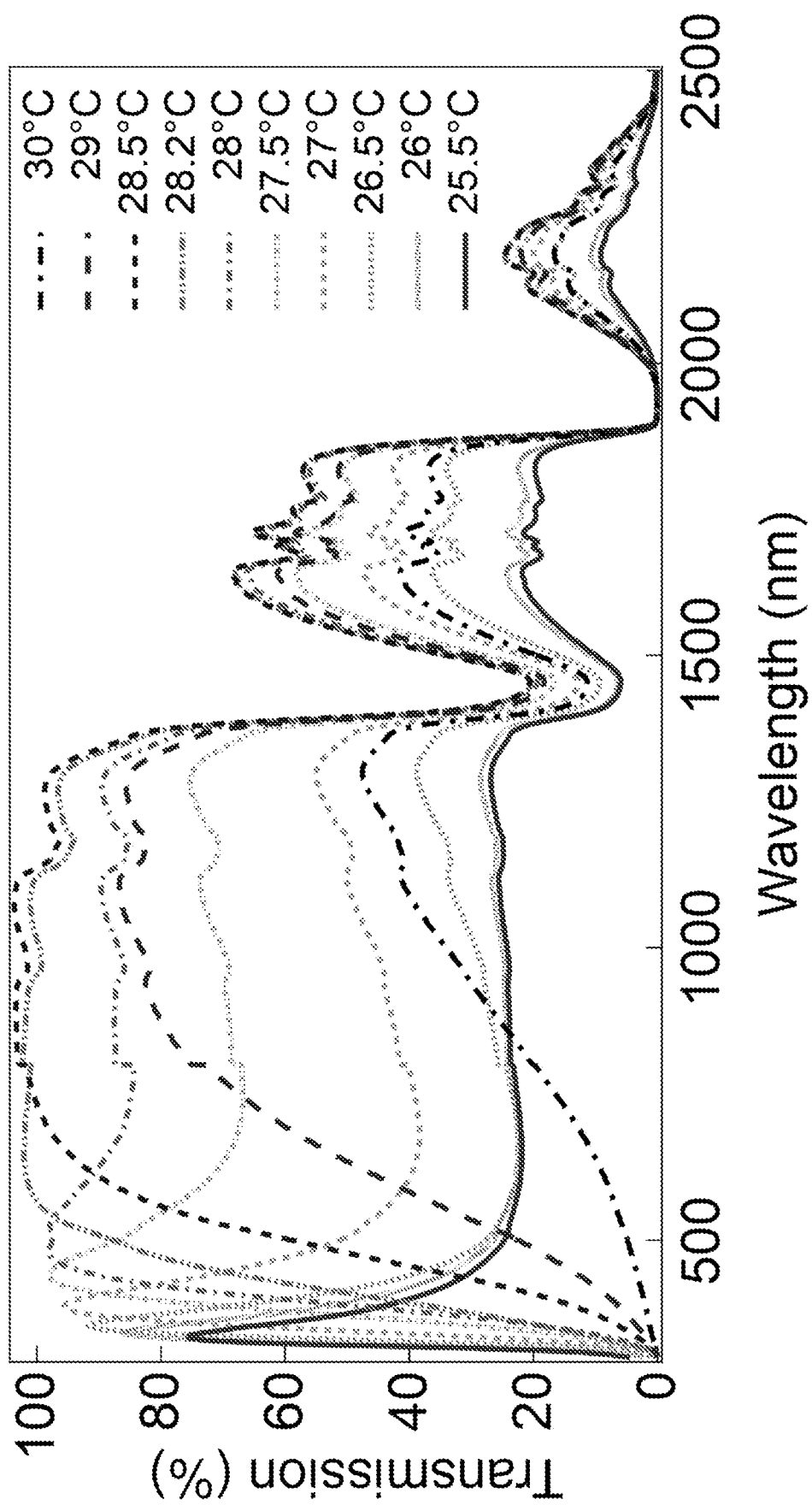
FIG. 9: Transmission spectra of SeedGel embodiment as a function of wavelength that covers UV-visible to near infrared range at different temperatures.

The UV-VIS transmission of the SeedGel embodiment of the exemplary composition, as shown in FIG. 7 was found to be consistent with FIG. 6 with respect to the same trend observed at various temperatures. At relatively low temperatures (26° C.~27° C.), short wavelengths of light (below 400 nm) are transmitted through the SeedGel embodiment of the exemplary composition, while those with longer wavelengths are scattered away. By ramping up the temperature, the transmission peak shifts towards longer wavelength. A decrease in transparency across all wavelengths is observed by further increasing the temperature to 28.8° C. The well-defined peak suggests that it is possible to achieve high precision wavelength selection by temperature. Additionally, as shown in FIG. 8, an increase in the path length from 1 mm to 10 mm of the SeedGel embodiment of the exemplary composition, resulted in a dramatic reduction in the full width at half maximum (FWHM) of the transmission peak to 44 nm. Furthermore, not only in the visible range, the transmission in the infrared range up to 2500 nm can be tuned as well, as shown in FIG. 9. The control over the infrared range is extremely useful for managing heat transfers. The optical property of SeedGel embodiment can be applied to stimuli-responsive smart windows/optical filters. The thermally reversible liquid-gel transition makes it simple to install and readily adaptable to curved surface.

A series of experiments were thus designed to characterize the structure of the sample in order to unveil the physical mechanism. In literature, a preferential scattering/reflection of visible light (structural color) is commonly believed to be related to certain repeating distance. The tunability comes from the change of that distance. Therefore, three possible hypotheses need to be validated that may be accountable for the wavelength-selective transmission. Those include: 1. Whether repeating structures exist in the range comparable to the wavelength of visible light (380 nm-740 nm); 2. Do particles pack into crystalline domain with long range order; 3. If liquid crystal is formed with solvent molecules.

The scattering profiles of the SeedGel embodiment of the exemplary composition within the temperature range (27° C. and 30° C.) exhibiting tunable structural color characterized by neutron (USANS/SANS) and X-ray scattering (SAXS/WAXS) over a wide q-range spanning five orders of magnitude, from $3\times10^{-5}$ Å$^{-1}$ to 6 Å$^{-1}$. This corresponds to structure size from angstrom level to ~20 μm that includes all the relevant sizes. Ultra-small angle neutron scattering (USANS) and small angle neutron scattering (SANS) were used to characterize micrometer domains, particle packing and shape of individual nanoparticles. Domain size was found to be on the order of a few micrometers (peak at $q=1.7\times10^{-4}$ Å$^{-1}$) and the interparticle distance was ~30 nm (peak at $q=0.023$ Å$^{-1}$). Neither of them changes with temperature between 27° C. and 30° C. that shows tunable transmission. A $q^{-4}$ decay is observed between $1.7\times10^{-4}$ Å$^{-1}$ and 0.023 Å$^{-1}$, indicating a smooth interface. This also suggests that no repeating distance appears with a length scale that is comparable to the wavelength of visible light. The uncorrelated structure-property-relationship in large length scale motivated further investigations in smaller distances. However, the broad peak at 0.023 Å$^{-1}$ suggests random packing of nanoparticles, which is also irresponsive to temperature change. Scattering results from a collimated synchrotron beam confirms the SANS results that nanoparticles do not crystallize. Still, no correlation between temperature and structure change can be inferred from small angle X-ray scattering (SAXS) and wide-angle X-ray scattering (WAXS) results. Solvent molecules are not organized into liquid crystals, since only broad peaks appear down to angstrom level. In comparison to the widely used methods to control structural color or select light transmission with a size change, the results from the SeedGel embodiment of the present composition point towards a completely new mechanism to realize dynamically controlled coloration.

Due to the scattering length density (SLD) differences between each component, neutron and X-ray are much more sensitive to silica nanoparticles over binary solvent systems. To light, the contrast comes from the different refractive index in the system. Different from X-ray and neutron, the refractive index of lutidine is comparable to that of silica and is higher than that of water. Therefore, wavelength dependent refractive index of the bicontinuous domains was investigated. The binary solvent systems dynamically exchange in response to temperature change. Contrast matched SANS experiments revealed the compositions of lutidine and water in each domain. The weight fraction of lutidine in the particle domain was found to decrease from 15% at 27.5° C. to less than 10% at 30° C. A reduction of lutidine in particle domain suggests an increase of its concentration in solvent domain due to mass balance. The wavelength dependent refractive index of both domains could be calculated using Lorentz-Lorenz formula based on composition of particles and solvents. It was found that the two domains show similar refractive index, but different wavelength dependence. At a given temperature, contrast between bicontinuous structure disappears for short wavelength of light (~400 nm), where the refractive index is 'matched'. Ramping up the temperature reduces the lutidine ratio in the particle domain, thus the refractive index, and increases that in the solvent domain. Consequently, the narrow band with 'matched' refractive index shifts towards longer wavelength. Based on the calculation, a combined change of only 0.007 in refractive index was enough to shift the transmission peak across the whole visible range. The rest of the light that could 'view' both micrometer domains experience strong scattering due to micrometer domains, which is responsible for the colorful scattered light as shown in FIG. 6. Based on the lutidine ratio extrapolated from contrast matched SANS experiment, a temperature change from 30° C. to 27.5° C. would result in a refractive index difference of ~0.0135, which is more than enough to shift the transmitted light from blue to yellow. The calculated transmission by slightly varying the relative refractive index between the two domains to simulate the effect of temperature change. The peak in transmission was found to be closely correlated to the matched refractive index between the two domains. An increase in temperature leads to a red shift of the transmitted light, which is consistent with the experimental results in FIG. 7. This proposed mechanism is further corroborated by static light scattering experiments with a 532 nm laser. The contrast was greatly reduced to a minimum at 28.1° C., which confirms that the solvent exchange between the two domains driven by temperature change results in partial refractive index matching.

Based on this mechanism, longer pathlength exponentially increases the scattering of light, which explains the better defined FWHM of transmitted light in FIG. 8. The A narrow bandwidth is usually preferred to avoid crosstalk between different colors. The achieved 44 nm FWHM in FIG. 8 is comparable to that of quantum dots.

In conclusion, a new mechanism to achieve tunable light scattering and transmission is proposed from disordered material with micro-meter domains. The modulation of the optical properties originates from temperature dependent miscibility of a binary solvent system, rather than the size change of structures. The material described here is 'smart' with two-folds of tunability. Its transmitted light wavelength is adjustable by temperature change and the temperature transition point can be customized at will. The controllable wavelength for the SeedGel embodiment of the exemplary embodiment is broad in range and narrow (precise) in bandwidth (44 nm) at a given temperature. Its mechanism for tunable optical property opens a door to a new library of materials that can be used for photonic devices, including smart windows, optical fibers, sensors and memories. A new material design guideline is proposed that light modulation can be realized by domains with different refractive index dependence on wavelength. There is no requirement for the shape of the domain, given it is large in size that can strongly scatter light. The mechanism discussed here could be extended to porous materials by refilling a partially miscible binary liquid.

Supplementary Note 3-1: Evidence from SAXS
Measurement Rules Out the Possibility of
Crystalline Arranaement of Particles Photonic crystals are known to scatter certain wavelength of the visible light that is related to its lattice parameter. Typically, an ordered close packing with an interparticle distance of a few hundred nanometers (comparable to the wavelength of light) is used in the photonic crystals. Thus, a characterization of particle packing is rather important in shining light to the mechanism for the tunable optical transmission. Small angle X-ray scattering (SAXS) measurement with a pinhole collimation was thus conducted. The results were consistent with the SANS results. The peak within this q-range represents a uniformly distributed particle distance with short-range order. The inter-particle distance corresponds to a length scale of ~30 nm. However, no sharp peak was observed in the probed q-range, indicating that the nanoparticles do not form long range order (crystals). The mechanism of the tunable transmission and scattering of light originates from a disordered structure.

Supplementary Note 3-2: Calculation of the
Wavelength Dependent Averaged Refractive Index
of Both the Particle and Solvent Domain In order to calculate the averaged refractive index, the composition of each component in both of the domains need to be measured. The SANS profiles of a composition with scattering length density (SLD) of water contrast matched to that of the silica were measured by adjusting the volume ratio of $H_2O$ and $D_2O$ to 42:58. In the gel state, the nanoparticles are jammed within particle domain that is rich in water because the particle surface is highly charged and hydrophilic. As the water phase is contrast matched to that of silica, the scattering intensity of the interparticle peak is reduced when the gel is formed. This reduction is in comparison to the sample at 20° C. when the solvent molecules are miscible. In the liquid state (20° C.), the contrast comes from the difference of SLD between silica and solvent mixture that contains lutidine. Higher temperature drives lutidine away from the particle domain, further lowering the structure factor peak for the sample at 30° C. compared to that at 27.5° C. In contrast, the peak intensity remains almost constant for the sample with 'unmatched' water phase. The ratio of the peak intensity of the 'matched' and 'unmatched' sample at the same temperature could be used to estimate the weight fraction of both water and lutidine in both particle and solvent domains. The detailed description of the method is presented in our previous publication. (1) It is calculated that in the particle domain, the weight fraction of lutidine could decrease from 15.3% to 9.7% when the temperature is increased from 27.5° C. to 30° C. The concentration of lutidine in the solvent domain can be inferred using mass balance. The amounts of different components in both domains are listed in Table S4-1. It is important to note that the fraction of each component is normalized to the total mass of solvent in each domain. In this temperature range, the concentration of silica nanoparticles in the particle domain does not change and is fixed at a volume fraction of 39.1%. This is suggested by the unchanged structure factor peak of SANS at varied temperatures.

TABLE S4-1

The calculated weight percentage of lutidine and water in both particle and water domain.

| | Particle Domain | | Solvent Domain | |
|---|---|---|---|---|
| | Lutidine (%) | Water (%) | Lutidine (%) | Water (%) |
| 27.5° C. | 15.3 | 84.7 | 41.6 | 58.4 |
| 30.0° C. | 9.7 | 90.3 | 47.3 | 52.7 |

Supplementary Note 3-3: Calculation of Light Transmission Based on Refractive Index of Both Domains Based on the refractive index obtained from the previous section, the light transmission can be calculated based on Equation 20. Here, the absorption of the light from the system is not considered because none of the components absorbs light in the visible range (FIG. 29). The transmitted intensity of light (I) can be related to the incident intensity ($I_0$) with the scattering cross section ($\Sigma$) and pathlength (d). The scattering cross section is proportional to contrast (($\Delta\rho)^2$) between the particle and solvent domains. 'A' is a constant value that is related to the concentration, volume, form factor, structure factor of the bicontinuous domain that do not change with temperature. Here, a fixed value of $5.24\times10^{11}$ $\text{Å}^3$ is used for 'A' to result in a reasonable transmission range between 0 and 1. A pathlength of 1 mm is used for the calculation if not specified. The contrast term can be calculated using the refractive index of the particle domain ($n_p$) and the solvent domain ($n_s$), as well as the wavelength of the light ($\lambda$) in Equation 21.

$$\frac{I}{I_0} = e^{-\Sigma d} \propto e^{-(\Delta\rho)^2 Ad} \quad (20)$$

$$\Delta\rho = \frac{3\pi n_s^2}{\lambda^2} \frac{\left(\frac{n_p}{n_s}\right)^2 - 1}{\left(\frac{n_p}{n_s}\right)^2 + 2} \quad (21)$$

The gradual change of the relative refraction index of the two domains due to temperature increase leads to partial matching of the two domains at short wavelength (low temperatures) to partial matching at long wavelength (high temperatures). The calculated light transmission was plotted in the same figure. It is clear from the data that the wavelength with the closest refractive index between the two domains show the largest light transmission. Other wavelengths of light are scattered away. By increasing the temperature, lutidine is driven out from the particle domain to the solvent domain. As a result, the refractive index of the particle domain is reduced and that of the solvent domain is increased because the refractive index of lutidine is higher than both domains. As the two domains show different wavelength-dependent refractive index change (different curvatures), only a small portion of the wavelength can be transmitted through the sample. Since this wavelength selection is purely due to scattering, the pathlength can be used to better define the full width at half maximum (FWHM) of the transmitted light. is a demonstration of the change of the FWHM by increasing the thickness of the sample. The transmitted light could confine the bandwidth from above 100 nm to only 44 nm.

Supplementary Note 3-4: Static Light Scattering Measurement Confirms the Wavelength Dependent Dynamical Matching of the Refractive Index Between Particle and Solvent Domains Static light scattering measurement was conducted on a gel sample within the temperature range that shows color transition with a 532 nm laser. The flat scattering curve of the solvent mixture (lutidine and water) at different temperatures indicate that the solvent mixture itself does not form structures in the length scale corresponding to this q-range. In contrast, the gel sample with silica nanoparticles exhibit a dramatic increase of the scattering intensity at 27° C. Further increasing the temperature reduces the scattering intensity. At 28.6° C., the scattering intensity comes back up. This is consistent with the proposed mechanism that the exchange of lutidine between the particle and solvent domain leads to a wavelength-dependent refractive index change. The strong scattering at 27° C. is due to the large size of the bicontinuous micro-meter domains. Further increasing the temperature reduces the refractive index difference between the two domains, where a reduction of the scattering intensity at low-q is observed. The transmission of 532 nm light through the exemplary composition is sharply increased at 28.1° C. Further increasing the temperature moves the refractive index matched point to a longer wavelength, thus improving the contrast between the two domains.

Experiment No. 4: Customizable Color Transition Range

In an aspect, there is provided a method of dynamically tuning radiation transmission comprising providing the composition, as disclosed hereinabove, in the gel state, and changing a temperature of the composition to thermo-reversibly modify peak radiation transmission at a first wavelength transmissivity from having high transmissivity at a range of wavelength at a first temperature to having a second wavelength transmissivity less than the first transmissivity at a second temperature. In an embodiment, the composition in the gel state has tunable wavelength-dependent properties for a range of wavelengths as a function of temperature. In an embodiment, the step of changing the temperature of the composition comprises heating the composition. In an embodiment, the step of changing the temperature of the composition comprises cooling the composition.

As shown in FIG. 6D, a display was placed on the other side of the SeedGel embodiment sample, with the experimental set as shown in FIG. 6B. The word "Seed" was in red color and the word "Gel" was in blue color. At low temperature (20° C.), the sample is in the liquid state, where no large structures are formed, both red and blue light can transmit through the sample and visible by eyes. This indicates that the dynamically tunable transmission was made possible by the structures formed in the sample, rather than due to the chemical components in the sample that either absorb or emit light. At high temperature (close to 29° C.), the sample allows red light to pass through, but block out the blue light. Slightly cooling down the sample, while still in the gel state, the sample allows blue light to pass through without permitting the red light.

The transmitted and scattered light showed complementary colors. At the temperature when transmitted light is yellow, the scattered light is blue. The same observation goes for a different temperature that the scattered light is yellow when the transmitted light is blue. The only difference between the two pictures is temperature. The picture on the right is taken with a lower temperature.

The exemplary composition for the SeedGel embodiment is very sensitive to temperature change. A slight change of temperature by only 0.1° C. could lead to a peak shift of more than 10 nm of the peak of the transmitted light.

Figure 10A:
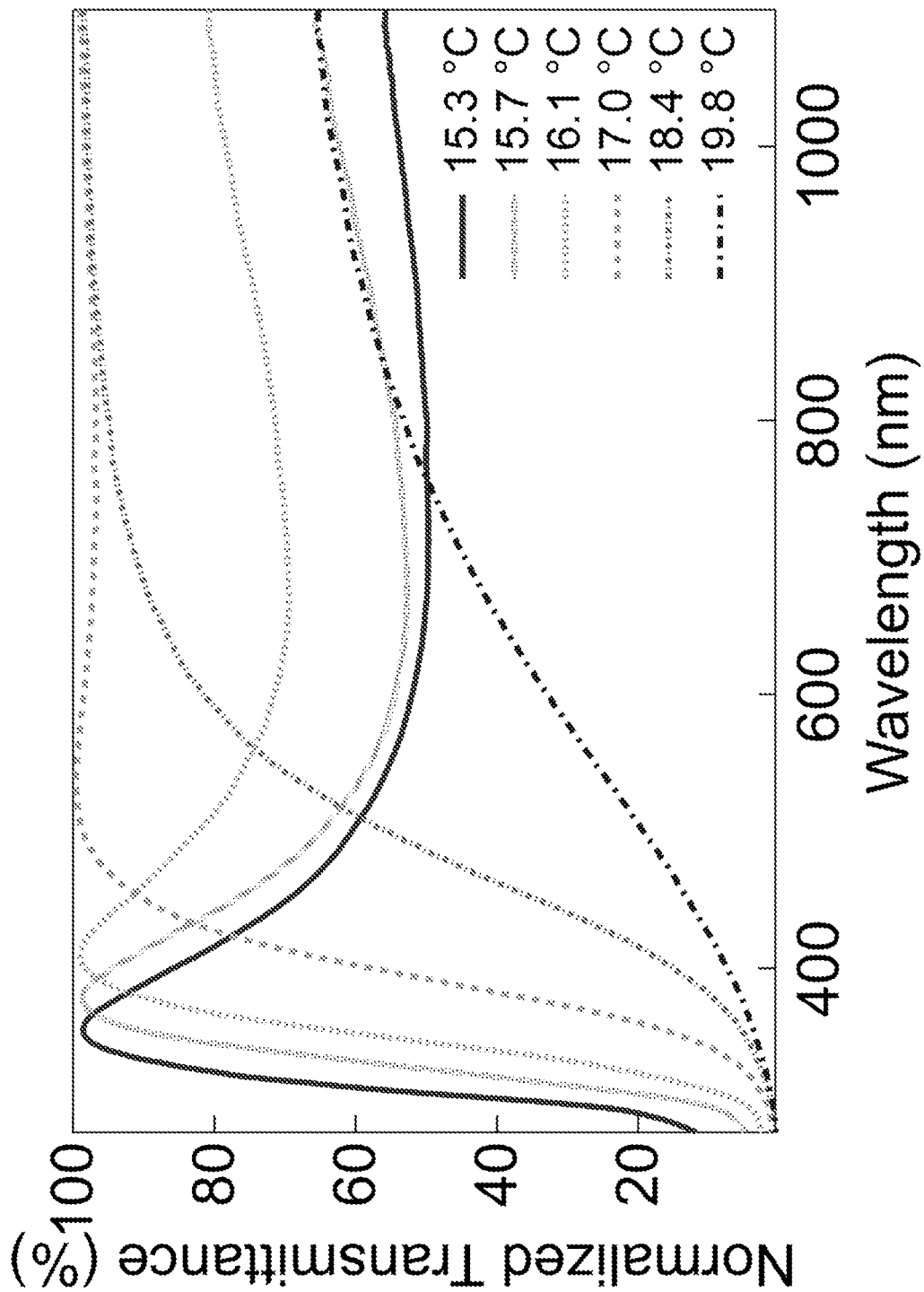
FIG. 10A: Transmittance spectra of SeedGel embodiment samples prepared with binary solvents of water/2,4-lutidine at different temperatures.
Figure 10B:
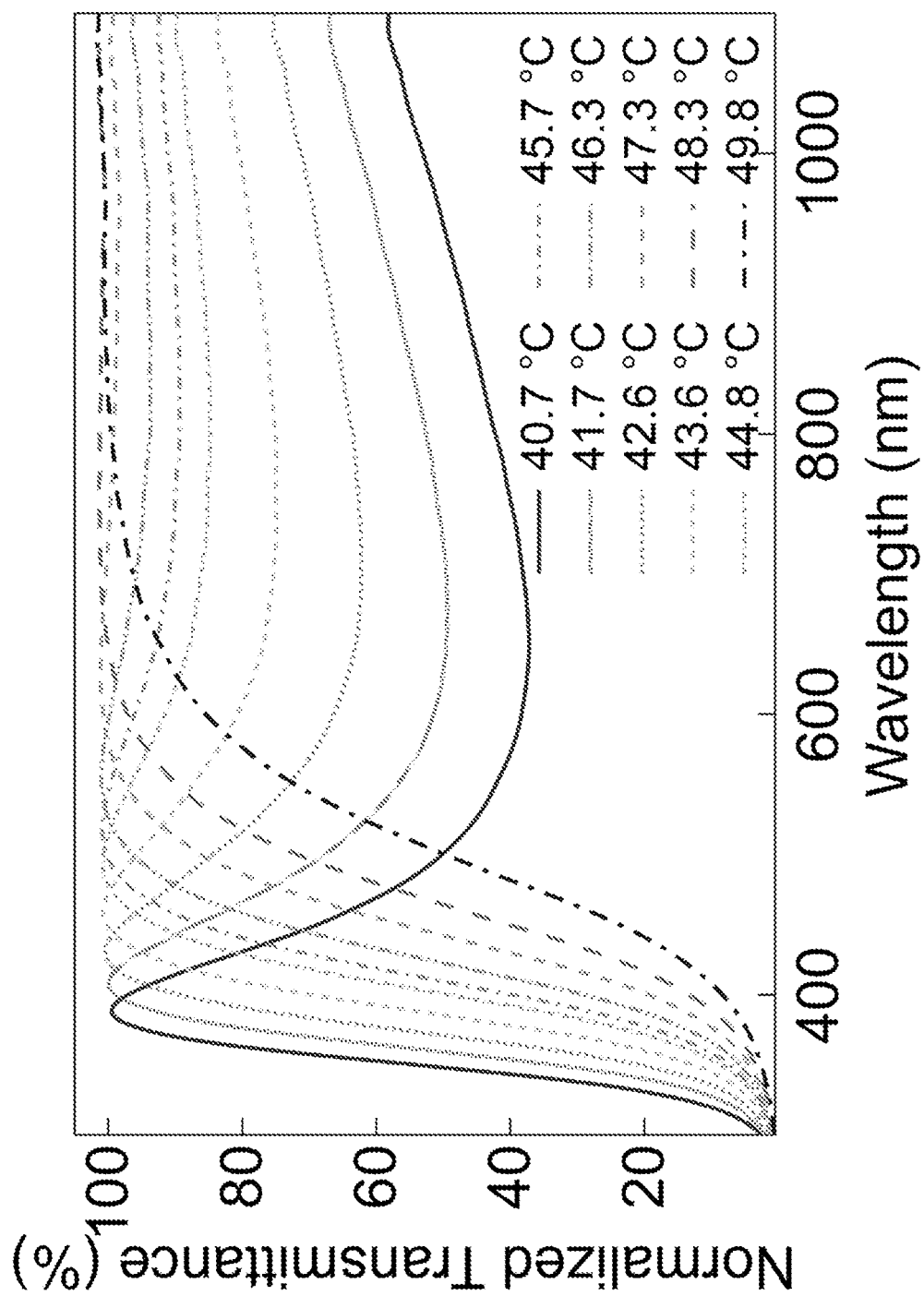
FIG. 10B: Transmittance spectra of SeedGel embodiment samples prepared with binary solvents of water/3-methylpyridine at different temperatures.
Figure 11:
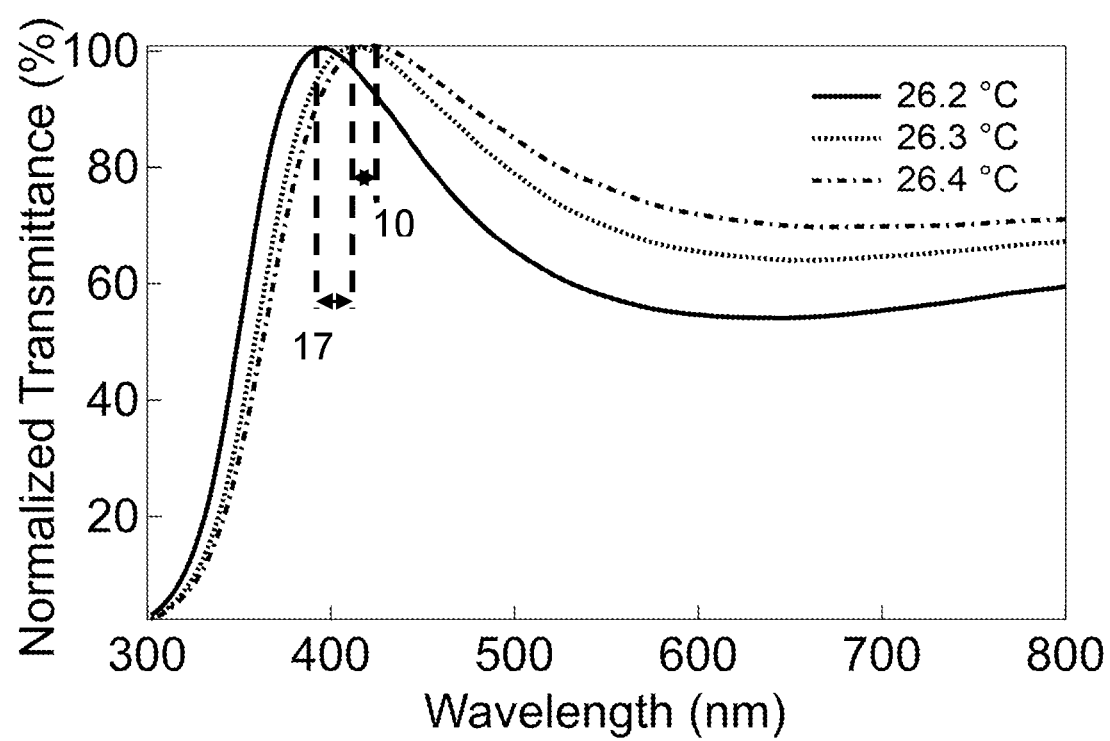
FIG. 11: Transmission spectra of SeedGel embodiment samples prepared with binary solvents of water/2,6-lutidine shows sensitive response of the peak to the temperature change.

Additionally, the color range of transmission can be customized to meet the requirement of specific applications across a wide temperature range. FIG. 10A shows the transmission measurement at different temperatures. By using a binary solvent system of water/2,4-lutidine, the transition temperature can be shifted to below 20° C. The solvent pair of water/3-methylpyridine increases the temperature transition range to close to 50° C.

Experiment No. 5: Examples of Shifting Color Transition Range Using Different Solvent Pairs in Seedgel Embodiment In this experiment, different solvent pairs were used to achieve different color transition temperatures. A wide color transition range is demonstrated herein with three solvent pairs: water/2,4-lutidine, water/3-methylpyridine, water/deuterated 3-methylpyridine, and water/2-methylpyridine. Same Ludox® TM as used hereinabove was used. The composition preparation procedure remained the same, but the concentration of both the nanoparticles and the solvents were different in this experiment. Here, 300 µl of 2,4-lutidine, 400 µl of 3-methylpyridine, or 400 µl deuterated 3-methylpyridine, or 400 µl 2-methylpyridine are mixed with 1 ml Ludox® TM to achieve different color transition temperatures. Each sample went through vortex and rolling to ensure a good mixing of the different components.

By using different solvent pairs, the color transition temperature can be customized at will. A wide range of transition temperatures for tunable light transmission can be designed to meet the requirements of specific applications. By using a binary solvent system of water/2,4-lutidine, the transition temperature can be shifted to below 20° C. The solvent pair of water/3-methylpyridine increases the temperature transition range to between 40° C. and 50° C. It is important to point out that by replacing 2,4-lutidine with 3-methylpyridine, not only the transition temperature is increased, the temperature range for color transition is also widened.

Figure 12:
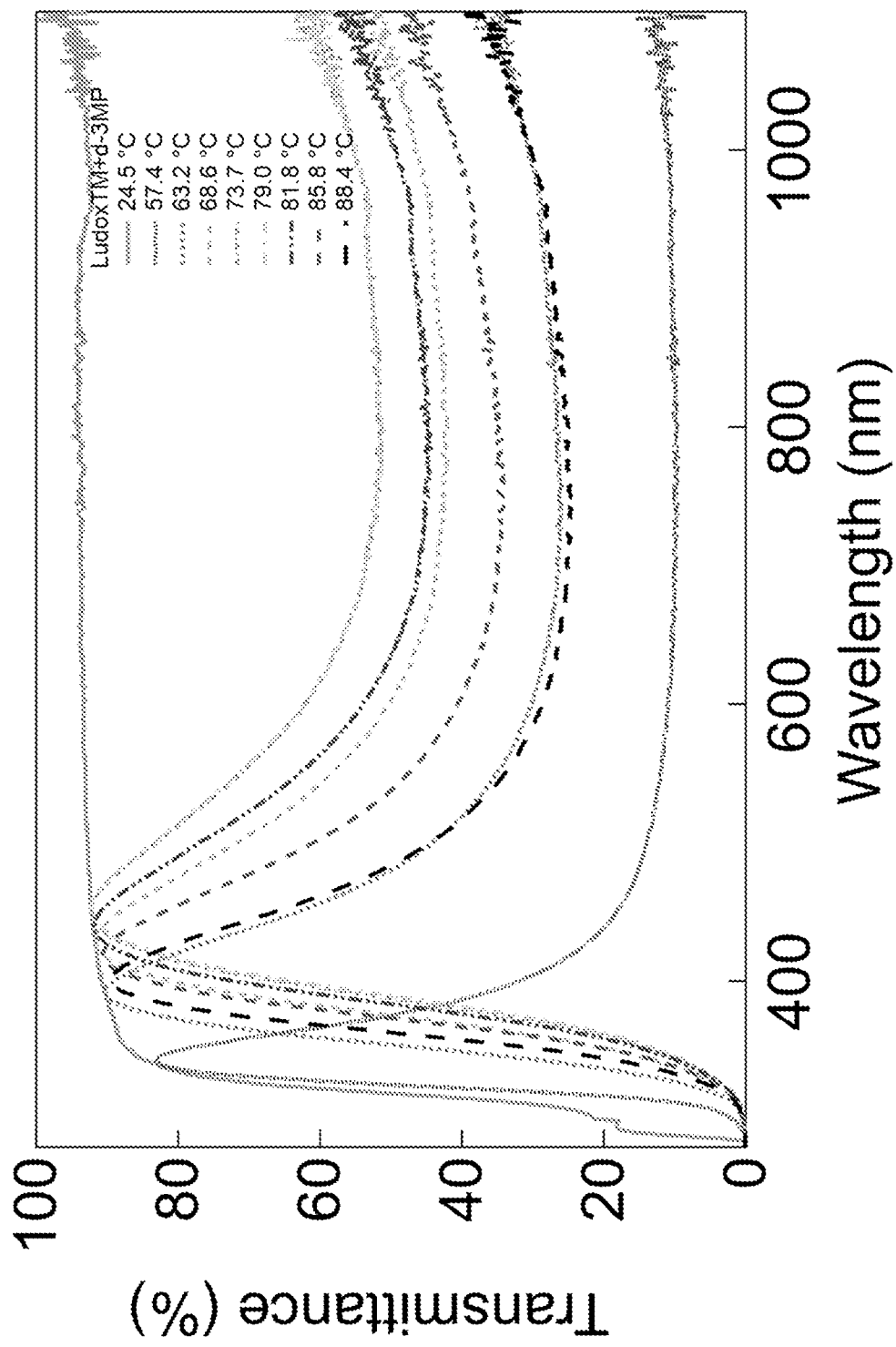
FIG. 12: UV-vis transmittance spectra of a SeedGel embodiment prepared with binary solvents of water/deuterated 3-methylpyridine at a temperature range of 24-90° C.

It was observed that the solvent deuteration also affects the color transition temperature of the sample. FIG. 12 shows a SeedGel embodiment of another exemplary composition comprising a binary solvent system of water/deuterated 3-methylpyridine. The color transition temperature was found to increase by about 20° C. With deuterated solvents, the temperature that produces transmission peak at 400 nm is shifted up from ~40° C. to ~60° C. So, the temperature range that the sample showed color transition is between 60° C. and 80° C. Compared to water/hydrogenated 3-methylpyridine, the temperature range becomes even broader in the binary solvent system of water/deuterated 3-methylpyridine. It is also interesting to observe in FIG. 12 that the wavelength of the transmission peak started to shift back towards the short wavelength side above 80° C. with the binary solvent system of water/deuterated 3-methylpyridine.

Figure 13:
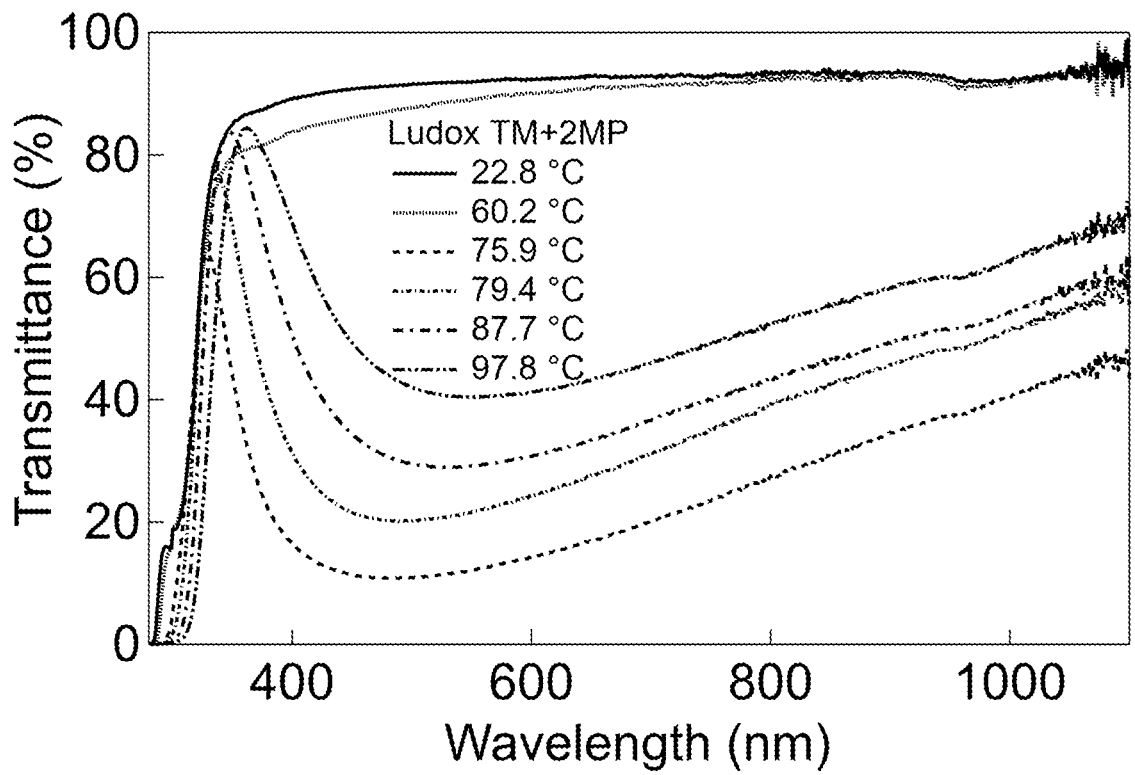
FIG. 13: UV-vis transmittance spectra of a SeedGel embodiment prepared with binary solvents of water/2-methylpyridine at a temperature range between 75-98° C.

The color transition temperature can be raised even higher if the solvent pair of water/2-methylpyridine is used. The results in FIG. 13 shows that the onset of the color transition temperature can be increased from 60° C. to 75° C. Similar to what has been observed in other solvent pairs, the transmission peak shifts towards longer wavelength by increasing the temperature from 75° C. to 98° C.

Experiment No. 6: Demonstration of Tunable Structural Color in a Different System with the Same Mechanism In an aspect, there is a method of tuning radiation transmission comprising providing a composition comprising microparticles dispersed in a binary solvent system, wherein a refractive index of the binary solvent system is close to that of the plurality of microparticles. The method further comprises tuning the transmission of radiation through the composition by changing a solvent fraction of the two solvents of the binary solvent system. The microparticles and the binary solvent system present in the composition are chosen such that they have different dependence of their respective refractive index on wavelength. Additionally, the refractive index of the microparticles matches with that of the binary solvent system at certain compositions of the binary solvent system.

In an embodiment of the method, the binary solvent system comprises toluene and n-hexane. In another embodiment, the binary solvent system comprises a first solvent present in an amount of 45 to 65%, by weight, based on the total weight of the binary solvent system. In an embodiment, the microparticles have an average particle diameter in the range of from 1 µm to 12 µm.

Figure 14:
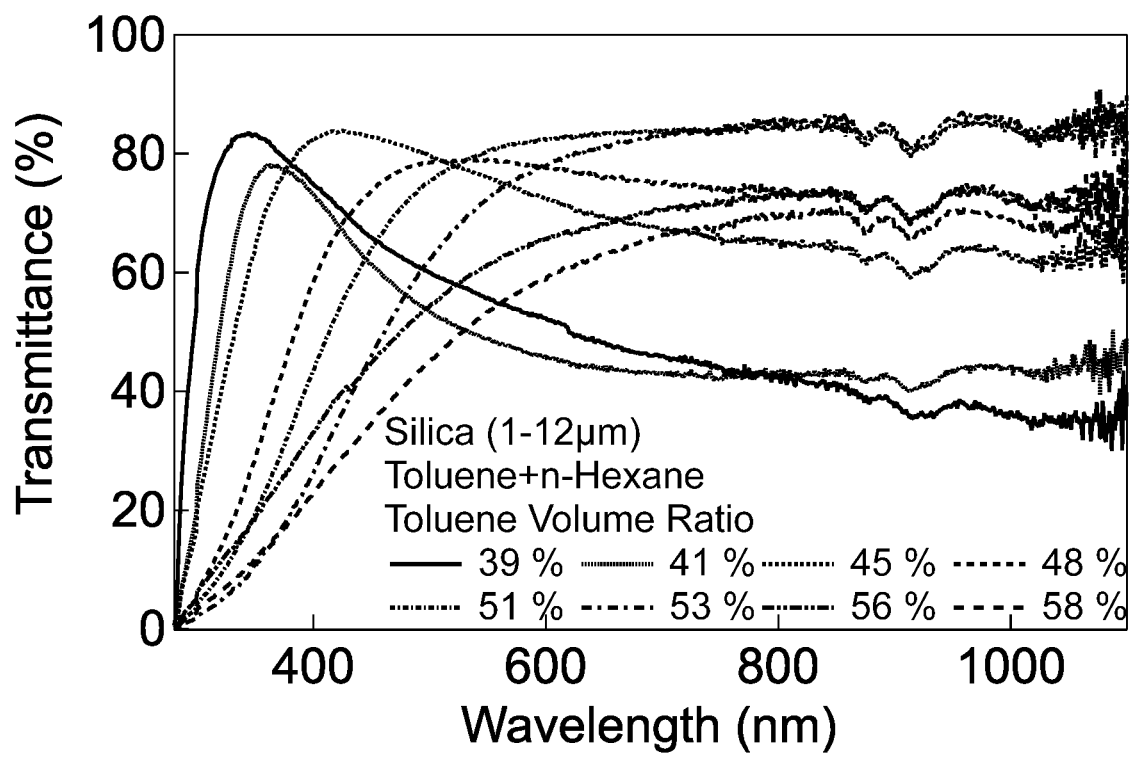
FIG. 14: UV-vis transmittance spectra of a microparticle dispersion in a binary solvent of toluene and n-hexane. The ratio indicates the volume fraction of toluene in the binary solvent mixture of toluene and n-hexane.

In an aspect, an exemplary composition comprises a silica microsphere dispersion in a binary solvent system was used. The size of silica particles was in the range of 1 µm-12 µm (Cospheric LLC). The binary solvent system consisted of toluene and n-hexane was used as a solvent. The particle surface was coated with dimethylpolysiloxane, so that it was wettable by organic solvent with a low polarity. By mixing toluene with n-hexane, the refractive index of the solvent can be shifted at different volume fractions. A range of toluene concentration between 39% and 58% was used. The silica particle concentration was 50 mg/ml. Thus, FIG. 14 shows transmission of the exemplary composition at different solvent fractions.

The systematic study clearly demonstrates that the color transition range can be designed over a wide range of temperatures. It is also important to note that this technology does not just work for SeedGel embodiment formed with nanoparticles. Both the solvent pair and the particles can be replaced at the same time. A new system that shows the color transition based on the same mechanism is made possible by using microspheres dispersed in a binary mixture of toluene and n-hexane. The sample is in a liquid state. A smaller toluene amount resulted in the transmission of short wavelength and more toluene in the solvent led to a shift of the transmission peak to longer wavelength. This experiment provides evidence that the mechanism we proposed to explain the color transition in SeedGel embodiment is valid. It also offers opportunity to control the light transmission in a completely different system (liquid dispersion in organic solvents) without gel formation.

In an aspect, there is provided a device comprising the composition, as disclosed hereinabove. In an embodiment, the composition comprises nanoparticles and the composition transitions from liquid state to a gel state upon changing temperature from a first temperature. In an embodiment, the step of changing the temperature of the composition from the first temperature comprises heating the composition above the first temperature. In another embodiment, the step of changing the temperature of the composition from the first temperature comprises lowering the temperature of the composition below the first temperature. In another embodiment, the composition comprises microparticles and the composition does not undergo gel transition. The device can comprise a filter, a temperature sensor, a smart window, a smart display, a battery, or a tissue growth scaffold.

In another aspect of the invention, there is provided method of thermo-reversibly controlling operation of a filter, the method comprising providing a filter having the composition, as disclosed hereinabove, in a liquid state and adjusting the temperature ramping rate of the thermo-reversible transition of the composition from the liquid state to the gel state, to thereby control operation of the filter. In an embodiment, the method comprises operating the filter to selectively filter or block radiation.

In an embodiment, the filter has a pore size defined by the two micro-domains, the method comprising tuning the pore size by controlling the size of the two micro domains by adjusting the temperature ramping rate.

In another embodiment, the method comprises operating the filter to selectively filter or block a component of a fluid. The fluid may comprise a solid/liquid system, solid/gas system, or a liquid/liquid system.

As used herein, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the dynamically tunable compositions, systems, and methods for making or using such systems. Additionally, in some embodiments, the invention can be construed as excluding any element or process step not specified herein.

Examples

Examples of the present invention will now be described. The technical scope of the present invention is not limited to the examples described below.

Materials

Chemicals and solvents were used as received without further purification. 2,6-lutidine (anhydrous, 99%), 2,4-lutidine (99%), 2,5-lutidine (95%), Ludox® SM (mass fraction of 30%), Ludox® TM-50 (mass fraction of 50%) and Rhodamine B (95%) were purchased from Sigma-Aldrich (St Louis, MO). Deuterium oxide (D, 99.9%) was obtained from Cambridge Isotopes (Tewksbury, MA). A different batch of 2,6-lutidine (98%) was also ordered from Tokyo Chemical Industry (TCI, Portland, OR). All solvents and chemicals were used as received without further purification.

Preparation of an Exemplary Compositions for SeedGel Embodiments

Ludox silica particles (Ludox® TM (PH≈9) and Ludox® SM (PH≈10)) are highly charged silica particles. The compositions for the SeedGel embodiment were prepared by mixing silica dispersions in water with lutidine at a specific ratio. Mixing lutidine and water does not alter the pH value so that all silica particles remain highly charged. The average size of Ludox® TM and SM particles is about 27 nm and 10 nm, respectively. To form SeedGel embodiment with 27 nm particles, lutidine volume of 300 µl was added to each milliliter (ml) of Ludox® TM solution. It corresponds to a weight fraction of 28.4% 2,6-lutidine and 71.6% water in the solvent.

Ludox® SM was used to form gel with 10 nm particles. Lutidine volume of 200 µl was added to gel the sample for every ml of Ludox® SM, which was equivalent to weight fraction of 17.8%. A clear and an opaque state were observed by eyes, but no UV-vis measurement was conducted.

In another exemplary composition, the gelation temperature was shifted by mixing 300 µl 2,4-lutidine or 2,5-lutidine with 1 ml of Ludox® TM solution.

Each of the above compositions were vigorously vortexed after mixing at desired ratios, which may cause the formation of a temporary gel at room temperature. Subsequent waiting time of a couple of days dissolved this temporary gel at room temperature, which led to a homogeneous solution that can form thermo-reversible gel at elevated temperatures.

It was found that a temporary gel may form due to initial mixing, but it can be dissolved when continuous rolling or periodically repeated vortexing is applied at room tempera- The table below summarizes various compositions for SeedGel embodiments that were used hereinabove to achieve dynamically tunable light transmission.

| Solvent A | Solvent B | Silica particle Size | Mass fraction of Solvent A in the binary solvent system | Particle volume fraction | Gelation Temperature | Periodicity | Correlation Length |
|---|---|---|---|---|---|---|---|
| 2,6-lutidine | $H_2O$ | 27 nm | 28.4% | 24.3% | 26° C. | | |
| 2,6-lutidine) | $H_2O$:$D_2O$:: 48%:52% mixture | 27 nm | 28.4% | 24.3% | | | |
| 2,4-lutidine | $H_2O$ | 27 nm | 28.4% | 24.3% | 17° C. | | |
| 2,5-lutidine | $H_2O$ | 27 nm | 28.4% | 24.3% | 7° C. | | |
| 2,6-lutidine | $H_2O$ | 10 nm | 17.8% | | | | |
| 2,6-lutidine | $H_2O$ | 27 nm | 32.4% | 16.5% | | | |
| 2,6-lutidine | $H_2O$ | 27 nm | 32.4% | 17.9% | | 12.6 μm | 2.58 μm |
| 2,6-lutidine | $H_2O$ | 27 nm | 32.4% | 19.6% | | 2.68 μm | 0.55 μm |
| 2,6-lutidine | $H_2O$ | 27 nm | 32.4% | 21.7% | | | |
| 2,6-lutidine | $H_2O$ | 27 nm | 35.7% | 13.7% | | | |
| 2,6-lutidine | $H_2O$ | 27 nm | 37.2% | 13.7% | | 2.65 μm | 0.52 μm |
| 2,6-lutidine | $H_2O$ | 27 nm | 38.7% | 13.7% | | | |
| 2,6-lutidine | $H_2O$ | 27 nm | 25.9% | 24.8% | | | |
| 2,6-lutidine | $H_2O$ | 37 nm | 28.8% | 24.0% | | | |
| 2,6-lutidine | $H_2O$ | 27 nm | 31.4% | 23.3% | | | |
| 2,6-lutidine | $H_2O$ | 27 nm | 38.5% | 11.5% | | 2.68 μm | 0.49 μm |
| 2,6-lutidine | $H_2O$ | 27 nm | 39.6% | 9.8% | | 2.97 μm | 0.53 μm |
| 2,6-lutidine | $H_2O$ | 27 nm | 16.6% | 41.7% | | | |
| 2-methylpyridine | $H_2O$ | 27 nm | 35.0% | 22.7% | 79° C. | | |
| 3-methylpyridine | $H_2O$ | 27 nm | 35.4% | 22.7% | 41° C. | | |
| d-3-methylpyridine | $H_2O$ | 27 nm | 35.9% | 22.7% | 57° C. | | |
| Toluene | n-Hexane | 1-12 μm | 58, 56%, 55%, 53%, 51%, 49%, 48%, 47%, 45%, 43%, 41%, & 39% | 2.2% | | | | ture. The formation mechanism for this temporary gel is similar to that of SeedGel embodiment in the sense that the solvents stay separated during the initial mixing and particles are kinetically jammed within the water-rich region to form mechanical percolation. Note that applying rolling is critical in the dissolution process to reach fully mixed samples in liquid states at room temperature. In the process of dissolving the initially formed gel, repeated vortex or continuous low shear applied by a roller were observed to be helpful during the first day of mixing. Additionally, the dissolution process can be accelerated by simply cooling down the composition to a lower temperature (4° C.) that is well within the single-phase region of water and 2,6-lutidine. The compositions were used after a certain aging time. It was found that the sample behaved the same as long as this aging time is anywhere from one day to a few days. For SeedGel embodiment with 10 nm particles, a waiting time of about 20 h was used to prepare a sample after 2,6-lutidine was mixed with Ludox® SM solution. The fully dissolved nanoparticle dispersions can thermo-reversibly form a gel at elevated temperatures.

It is important to note that pure 2,6-lutidine is a colorless liquid and an oxidized/degraded 2,6-lutidine may turn slightly yellow that can shift the transition temperature and phase diagram.

Consequently, homogenous solutions were obtained that showed structural color and tunable optical transmission in its gel state at elevated temperatures.

Following the convention currently adopted in the field, unless otherwise noted, volume fraction over the total sample volume is used to describe the concentration of silica particles, and the relative 2,6-lutidine concentration in the binary solvent system is expressed as mass fraction.

Methods

Small Angle Neutron Scattering (SANS) and Ultra-Small Angle Neutron Scattering (USANS)

Both SANS and USANS experiments were conducted at NIST center for neutron research (NCNR, Gaithersburg, MD). Both NG7 and NGB30 were used to collect SANS results. Scattering patterns from three detector positions, including lens, were recorded to provide a q-range of 0.001 $Å^{-1}$<q<0.45 $Å^{-1}$. Peltier-Driven heating/cooling blocks were utilized to control temperatures with a precision of ≤0.1° C. At least 30 min waiting time was implemented before measuring the scattering data after each temperature change to ensure that the equilibration was achieved. The sample was sealed by a demountable titanium cell with a path length of 1 mm with a Teflon coated O-ring. The scattering from a pair of quartz windows were properly subtracted. The open beam flux and transmission of each sample at every detector position was recorded to bring the scattering data to absolute intensity. The USANS experiments were conducted on BT-5 to cover a q-range between $3 \times 10^{-5}$ $Å^{-1}$ and 0.001 $Å^{-1}$. The temperature was controlled by circulation thermal bath. All the data reduction was performed using standard Igor (Wavemetrics, Portland, OR) macros. The fitting of the results was conducted using the SASView software.

For the contrast matching experiment using SANS, $D_2O$ was mixed with Ludox® TM/SM solution so that the volume ratio of $D_2O$ to $H_2O$ in the dispersion was 58:42. The scattering length density (SLD) of water phase was thus matched to that of silica. The addition of $D_2O$ only slightly changed the solution PH value (by about 0.3), which did not alter the stability of silica nanoparticles. An Amicon centrifugal filter unit (Ultra-15, MilliporeSigma, Burlington, MA) equipped with a membrane of 3 kDa pore size was used to filtrate out excess water. Centrifugation (Centrifuge 5702, Eppendorf, Hauppauge, NY) with relative centrifugal force (rcf) of 3000×g for around 30 min was used to concentrate nanoparticles close to their original volume fraction. Then desired volume of 2,6-lutidine was added to contrast matched silica dispersion for SeedGel embodiment formation with 27 nm and 10 nm particles.

Laser Scanning Confocal Microscopy (LSCM)

A confocal microscope (Zeiss model LSM 800, Thornwood, NY) with a 561 nm laser and 50×/0.5 air lens was used to conduct the LSCM experiment. A scanning z-step of 0.5 µm and an aperture size of 119 µm was used. The image acquisition was performed in fluorescence mode, using a fluorescent dye (Rhodamine B) that has a favorable affinity to the 2,6-lutidine rich phase. A quartz sample cell containing SeedGel embodiment was fit tightly into a customized sample holder, which was designed to allow a closely placed thermocouple near the sample cell. A constant temperature of 27.4° C. was maintained for at least 20 min before imaging a sample. The temperature control was achieved with an accuracy of ±0.1° C. by circulating fluid with an external thermal bath. Image acquisition was achieved with a scanning area of 127.8 µm×127.8 µm by collecting fluorescence light from 576 nm to 700 nm that emanated from the sample. Zen Blue (Zen 2.5 System) was used for the data collection. And Image J was used for the image processing.

SAXS and WAXS

Both the SAXS and WAXS measurements were performed on 9-ID beamline at Advanced photon source (APS) of Argonne National Laboratory (Lemont, IL, US). A q-range of 0.07 $Å^{-1}$<q<6 $Å^{-1}$ was realized by stitching the SAXS and USAXS results together. The energy of the X-ray beam used in the experiment was 21 keV. The temperature was controlled by Linkam (Tadworth, UK) THMS600 controller. Irena macro based on Igor package was used to analyze the data.

UV-Vis Spectroscopy

A Thermo Scientific Evolution 201 UV-VIS Spectrometer (Waltham, MA, US) was used to record the optical transmission spectrum as a function of temperature. A cuvette with a pathlength of 1 mm was utilized. The temperature was precisely controlled by a Peltier element connected to a thermal bath. The temperature was equilibrated for at least 15 min before each measurement. A Cary 5000 (Agilent, Santa Clara, CA, USA) spectrometer was utilized to extend the measurement to near infrared range.

Zeta Potential Measurement

Zeta potential measurements using Zetasizer were performed on the silica particles dispersed in water, which is closely related to how repulsive the particles are in the solvent. The measurements were done in both 10 nm and 27 nm particles dispersed in pure water. The concentrations of particles were both at 1% by volume. For each particle, the measurements were repeated three times. For 10 nm particles, the results are shown below:

$zeta\_1$=−31.0±9.2 mV;
$zeta\_2$=−33.3±10.7 mV;
$zeta\_3$=−32.8±11.2 mV.

For 27 nm particles, the zeta potential of the three measurements are shown below:

$zeta\_1$=−38.4±28.2 mV;
$zeta\_2$=−40.0±29.6 mV;
$zeta\_3$=−37.3±28.6 mV.

The invention claimed is:

1. A composition comprising:
    an effective amount of nanoparticles dispersed homogeneously in a binary-solvent system comprising a first solvent and a second solvent, the binary solvent system being a single-phase, in a liquid state at or below a first temperature;
    wherein the nanoparticles have a preferential wettability to the first solvent,
    wherein the composition is disposed, upon changing from the first temperature, to transition thermo-reversibly from the liquid state to a gel state,
    wherein the gel state comprises bi-continuous domains including a particle domain and a solvent domain, and
    wherein the particle domain comprises nanoparticles dispersed in a first-solvent-rich fraction of the binary solvent system and the solvent domain comprises a second-solvent-rich fraction of the binary solvent system.

2. The composition of claim 1, wherein size of each of the particle micro-domain and the solvent micro-domain is dependent upon a temperature ramping rate of the thermo-reversible transition of the composition from the liquid state to the gel state.

3. The composition of claim 2, wherein each of the particle micro-domain and the solvent micro-domain have a different refractive index dependence on wavelength, and wherein the refractive index of the particle micro-domain matches with that of the solvent micro-domain for an identified wavelength at an identified temperature, whereby the composition becomes transparent to the identified wavelength at the identified temperature.

4. The composition of claim 3, wherein the composition in the gel state has tunable wavelength-dependent properties for a range of wavelengths as a function of temperature.

5. The composition of claim 4, wherein the wavelength-dependent properties comprise one or more of: scattering and transmittance.

6. The composition of claim 3, wherein the wavelength is in the range of 200 nm to 2400 nm.

7. The composition of claim 1, wherein the binary solvent system comprises one of the following mixtures of solvents:
    (i) water, deuterated water, or partially deuterated water and methylpyridine, dimethyl pyridine, deuterated or partially deuterated methylpyridine, deuterated or partially deuterated dimethylpyridine, or isomers thereof;
    (ii) water and methyl ethyl ketone;
    (iii) an alcohol and an alkane;
    (iv) ethylene carbonate and p-xylene;
    (v) ethylene glycol and nitromethane; or
    (vi) cyclohexane and nitromethane.

8. The composition of claim 1, wherein the nanoparticles have an average particle diameter in the range of from 5 nm to 100 nm.

9. A device comprising the composition of claim 1.

10. The device of claim 9, wherein the device is selected from a filter, a temperature sensor, a smart window, a smart display, a battery, or a tissue growth scaffold.

11. A method of dynamically tuning radiation transmission comprising:
    (i) providing the composition of claim 1 in the gel state, and
    (ii) changing a temperature of the composition to thermo-reversibly modify peak radiation transmission at a first wavelength at a first temperature to a second wavelength at a second temperature.

12. A method of thermo-reversibly controlling operation of a filter, the method comprising:
(i) providing a filter having the composition of claim 1 in a liquid state;
(ii) adjusting the temperature ramping rate of the thermo-reversible transition of the composition from the liquid state to the gel state, to thereby control operation of the filter.

13. The method of claim 12, comprising operating the filter to selectively filter or block radiation.

14. The device of claim 12, wherein the filter has a pore size defined by the two micro-domains, the method comprising tuning the pore size by controlling the size of the two micro domains by adjusting the temperature ramping rate.

15. The method of claim 14, comprising operating the filter to selectively filter or block a component of a fluid.

16. The method of claim 15, wherein the fluid comprises a solid/liquid system, solid/gas system, or a liquid/liquid system.

17. A method of tuning radiation transmission comprising:
(i) providing a composition comprising microparticles dispersed in a binary solvent system, wherein a refractive index of the binary solvent is close to that of the plurality of microparticles, and
(ii) tuning the transmission of radiation through the composition by changing a solvent fraction of the two solvents of the binary solvent system,
wherein the microparticles and the binary solvent system have different dependence of their respective refractive index on wavelength, and
wherein the refractive index of the microparticles matches with that of the binary solvent system at certain compositions of the binary solvent system.

18. The method of claim 17, wherein the binary solvent system comprises toluene and n-hexane.

19. The method of claim 17, wherein the binary solvent system comprises a first solvent present in an amount of 45 to 65% by weight, based on the total weight of the binary solvent system.

20. The method of claim 17, wherein the microparticles have an average particle diameter in the range of from 1 μm to 12 μm.

* * * * *

UNITED STATES PATENT AND TRADEMARK OFFICE
CERTIFICATE OF CORRECTION

| | | |
|---|---|---|
| PATENT NO. | : 12,411,336 B2 | Page 1 of 1 |
| APPLICATION NO. | : 18/017106 | |
| DATED | : September 9, 2025 | |
| INVENTOR(S) | : Yuyin Xi and Yun Liu | |

It is certified that error appears in the above-identified patent and that said Letters Patent is hereby corrected as shown below:

In the Claims

In Column 41, Claim 14, Line 11: delete "the device of Claim 12" and insert -- the method of Claim 12 --.

Signed and Sealed this
Fourth Day of November, 2025

John A. Squires
*Director of the United States Patent and Trademark Office*